US00RE49009E

(19) United States
(12) Reissued Patent
Wang

(10) Patent Number: US RE49,009 E
(45) Date of Reissued Patent: Apr. 5, 2022

(54) ADJUSTABLE EXERCISE DEVICE

(71) Applicant: BETO ENGINEERING & MARKETING CO., LTD., Taichung (TW)

(72) Inventor: Lo Pin Wang, Taichung (TW)

(73) Assignee: BETO ENGINEERING & MARKETING CO., LTD., Taichung (TW)

(21) Appl. No.: 17/016,198

(22) Filed: Sep. 9, 2020

Related U.S. Patent Documents

Reissue of:
(64) Patent No.: 10,420,978
Issued: Sep. 24, 2019
Appl. No.: 15/342,137
Filed: Nov. 3, 2016

(51) Int. Cl.
*E06B 1/70* (2006.01)
*E06B 7/14* (2006.01)
*E06B 1/62* (2006.01)

(52) U.S. Cl.
CPC ..... *E06B 1/70* (2013.01); *E06B 1/702* (2013.01); *E06B 1/705* (2013.01); *E06B 7/14* (2013.01); *E06B 2001/628* (2013.01)

(58) Field of Classification Search
CPC ..... A63B 21/075; A63B 2071/0694; A63B 21/072; A63B 21/0605; A63B 21/0604
See application file for complete search history.

(56) References Cited

U.S. PATENT DOCUMENTS 295,429 A * 3/1884 Reach ..... A63B 15/00 482/109
1,524,888 A * 2/1925 Schuur ..... A63B 21/0605 482/108
1,917,566 A 7/1933 Wood
4,431,185 A * 2/1984 Cisneros ..... A63B 71/0036 482/93
4,659,079 A 4/1987 Blanchard
5,213,557 A * 5/1993 Firth ..... A63B 23/20 482/105
6,387,022 B1 * 5/2002 Smith ..... A63B 43/02 482/106
6,461,282 B1 * 10/2002 Fenelon ..... A63B 21/0601 482/106
7,011,611 B1 * 3/2006 Ripley ..... A63B 21/0728 482/107

(Continued)

FOREIGN PATENT DOCUMENTS

CN 101732827 A 6/2010
CN 202478474 U 10/2012

(Continued)

*Primary Examiner* — Terrence R Till

(74) *Attorney, Agent, or Firm* — Buchalter

(57) ABSTRACT

An adjustable kettlebell or exercise device includes a handle device formed on a receptacle, and one or more weight members selectively engageable into the receptacle, and a control device includes a shaft engaged through the receptacle and engageable through the weight members for selectively anchoring either of the weight members to the receptacle with the shaft. The weight members each include a bore for engaging with the shaft, and an opening communicating with the bore of the weight members, and the shaft includes one or more pins engageable through the openings of the weight members for selectively engaging with the weight members.

26 Claims, 27 Drawing Sheets

(56) References Cited

U.S. PATENT DOCUMENTS

| | | | | |
|---|---|---|---|---|
| 7,052,445 | B2 | 5/2006 | Ekhaus | |
| 7,182,715 | B2 | 2/2007 | Anderson | |
| 7,381,157 | B2 * | 6/2008 | Blateri | A63B 21/075 482/106 |
| 7,491,157 | B1 * | 2/2009 | Lin | A63B 21/0728 482/107 |
| 7,563,208 | B1 * | 7/2009 | Chen | A63B 21/0728 482/108 |
| 7,762,933 | B1 * | 7/2010 | Yu | A63B 21/072 482/107 |
| 7,811,212 | B2 * | 10/2010 | Chen | A63B 21/0728 482/106 |
| 7,824,319 | B2 * | 11/2010 | Carlesimo | A63B 21/00047 446/85 |
| 7,976,443 | B2 * | 7/2011 | Krull | A63B 21/075 482/107 |
| 8,021,282 | B2 * | 9/2011 | Polevoy | A63B 21/0783 482/108 |
| 8,033,965 | B1 * | 10/2011 | Krull | A63B 21/075 482/108 |
| D652,877 | S * | 1/2012 | Dalebout | D21/682 |
| 9,802,073 | B2 * | 10/2017 | Pawlas | A63B 21/4035 |
| 10,420,978 | B2 | 9/2019 | Wang | |
| 2004/0220025 | A1 * | 11/2004 | Krull | A63B 21/0728 482/94 |
| 2005/0003931 | A1 * | 1/2005 | Mills | A63B 21/0601 482/5 |
| 2007/0135274 | A1 * | 6/2007 | Blateri | A63B 21/075 482/109 |
| 2008/0081744 | A1 * | 4/2008 | Gormley | A63B 21/072 482/93 |
| 2009/0062085 | A1 * | 3/2009 | Polevoy | A63B 21/0728 482/93 |
| 2010/0210427 | A1 * | 8/2010 | Yu | A63B 21/072 482/93 |
| 2010/0331151 | A1 * | 12/2010 | Signorile | A63B 21/00196 482/93 |
| 2011/0263392 | A1 * | 10/2011 | Yu | A63B 21/072 482/93 |
| 2012/0053024 | A1 * | 3/2012 | Mendoza | A63B 21/072 482/106 |
| 2013/0040789 | A1 * | 2/2013 | Kessler | A63B 21/072 482/108 |
| 2013/0137555 | A1 * | 5/2013 | Hodes | A63B 21/0726 482/106 |
| 2013/0244843 | A1 * | 9/2013 | Burwell | A63B 21/0728 482/108 |

FOREIGN PATENT DOCUMENTS

| | | | |
|---|---|---|---|
| CN | 204932715 | U | 1/2016 |
| CN | 206304284 | U | 7/2017 |
| JP | 2007021123 | A | 2/2007 |
| TW | 414246 | U | 12/2000 |
| TW | M393328 | U | 12/2010 |
| TW | M414246 | U | 10/2011 |
| TW | I372069 | B | 9/2012 |
| TW | M534015 | U | 12/2016 |

* cited by examiner

ADJUSTABLE EXERCISE DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates to an adjustable exercise device or kettlebell or the like, and more particularly to an adjustable exercise device or kettlebell including an improved compact structure or configuration for allowing the weight members to be easily and adjustably attached to or disengaged from the weight carrier or handle and for allowing the user to easily operate the adjustable kettlebell.

2. Description of the Prior Art

Typical exercise devices or kettlebell devices comprise a normally U or C-shaped central handle member to be grasped or held or carried by the user, and a number of weight plates, weight members or kettle balls or kettle members to be attached onto the ends of the handle member for weight lifting or exercising purposes by the user, or for exercising or training the upper muscle groups of the user.

For example, U.S. Pat. No. 1,917,566 to Wood, U.S. Pat. No. 4,659,079 to Blanchard, U.S. Pat. No. 6,387,022 to Smith, U.S. Pat. No. 7,052,445 to Ekhaus, U.S. Pat. No. 7,182,715 to Anderson, U.S. Pat. No. 7,381,157 to Blateri, U.S. Pat. No. 7,491,157 to Lin, and U.S. Pat. No. 7,563,208 to Chen disclose several of the typical kettlebell devices each also comprising a normally U or C-shaped handle including two legs or limbs attached or mounted or secured to the weight members or kettle balls or kettle members for being held or grasped or carried by the user and for allowing the user to conduct various kinds of weight lifting or exercise operations.

However, the weight members or kettle balls or kettle members may not be easily and quickly and adjustably attached to or disengaged from the weight carrier or handle, and the typical adjustable kettlebell devices include a complicated structure or configuration that may not be easily and quickly made or manufactured by the manufacturers and that may include a complicated making or manufacturing procedure and that may include a greatly increased manufacturing cost.

The present invention has arisen to mitigate and/or obviate the afore-described disadvantages of the conventional adjustable kettlebell devices.

SUMMARY OF THE INVENTION

The primary objective of the present invention is to provide an adjustable exercise device or kettlebell including an improved compact structure for allowing the weight members to be easily and quickly and adjustably attached to or disengaged from the weight carrier or handle and for allowing the adjustable kettlebell to be easily operated by the users.

The other objective of the present invention is to provide an adjustable exercise device or kettlebell including an improved compact structure for allowing the adjustable exercise device or kettlebell to be easily and quickly made or manufactured by the manufacturers.

In accordance with one aspect of the invention, there is provided an adjustable exercise device comprising a receptacle including a chamber formed therein, and including a handle device provided thereon, a first weight member and at least one second weight member selectively engageable into the chamber of the receptacle, and a control device including a shaft engaged through the receptacle and engaged into the chamber of the receptacle, and engageable through the first and the at least one second weight members for selectively anchoring either the first or the at least one second weight member to the receptacle with the shaft.

The first and the at least one second weight members each include a bore formed therein for engaging with the shaft of the control device, and the first and the at least one second weight members each include an opening formed therein and communicating with the bore of the first and the at least one second weight members, and the shaft includes a first pin engageable through the opening of the first weight member for selectively engaging with the first weight member, and at least one second pin engageable through the opening of the at least one second weight member for selectively engaging with the at least one second weight member.

The first and the at least one second weight members each include a space formed therein and communicating with the bore and the opening of the first and the at least one second weight members for selectively engaging with the first and the at least one second pin respectively. The first and the at least one second weight members each include at least one depression formed therein and communicating with the bore and the space for selectively engaging with the first and the at least one second pin respectively.

The control device includes an actuating knob attached to the shaft for moving the shaft and the first and the at least one second pins relative to the receptacle. The actuating knob includes a cam member pivotally coupled to the shaft with a pivot axle for moving the shaft and the first and the at least one second pins up and down relative to the receptacle and the first and the at least one second weight members selectively. The receptacle includes a cap disposed thereon, and the cap includes an oblong hole formed therein for slidably engaging with the pivot axle.

The receptacle includes a plurality of indicia provided thereon, and the cap includes an indicator provided thereon for indicating either of the indicia of the receptacle. The receptacle includes at least one peg extended upwardly therefrom, and the cap includes a peripheral slot formed therein for slidably engaging with the at least one peg and for guiding and limiting the cap to rotate relative to the receptacle. The receptacle includes a spring biasing member engaged between the cap and the receptacle for selectively biasing and moving the cap upwardly from the receptacle.

The receptacle includes an upper wall for defining the chamber of the receptacle, and the receptacle includes a passage formed in the upper wall and communicating with the chamber of the receptacle. The receptacle includes at least one engaging member formed in the upper wall, and the first weight member includes at least one key extended therefrom for selectively engaging with the at least one engaging member of the upper wall and for anchoring the first weight member to the receptacle.

The receptacle includes at least one guiding channel formed therein and communicating with the chamber of the receptacle, and the first weight member includes at least one protrusion extended therefrom for slidably engaging with the at least one guiding channel of the receptacle and for preventing the first weight member from pivoting relative to the receptacle. The first weight member includes an engaging member formed in the at least one protrusion, and a cover includes a projection extended therefrom for engaging with the engaging member of the at least one protrusion and for detachably securing the cover to the first weight member.

The first weight member includes at least one recess formed therein, and the at least one second weight member includes at least one key extended therefrom for selectively engaging with the at least one recess of the first weight member and for anchoring the at least one second weight member to the first weight member.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
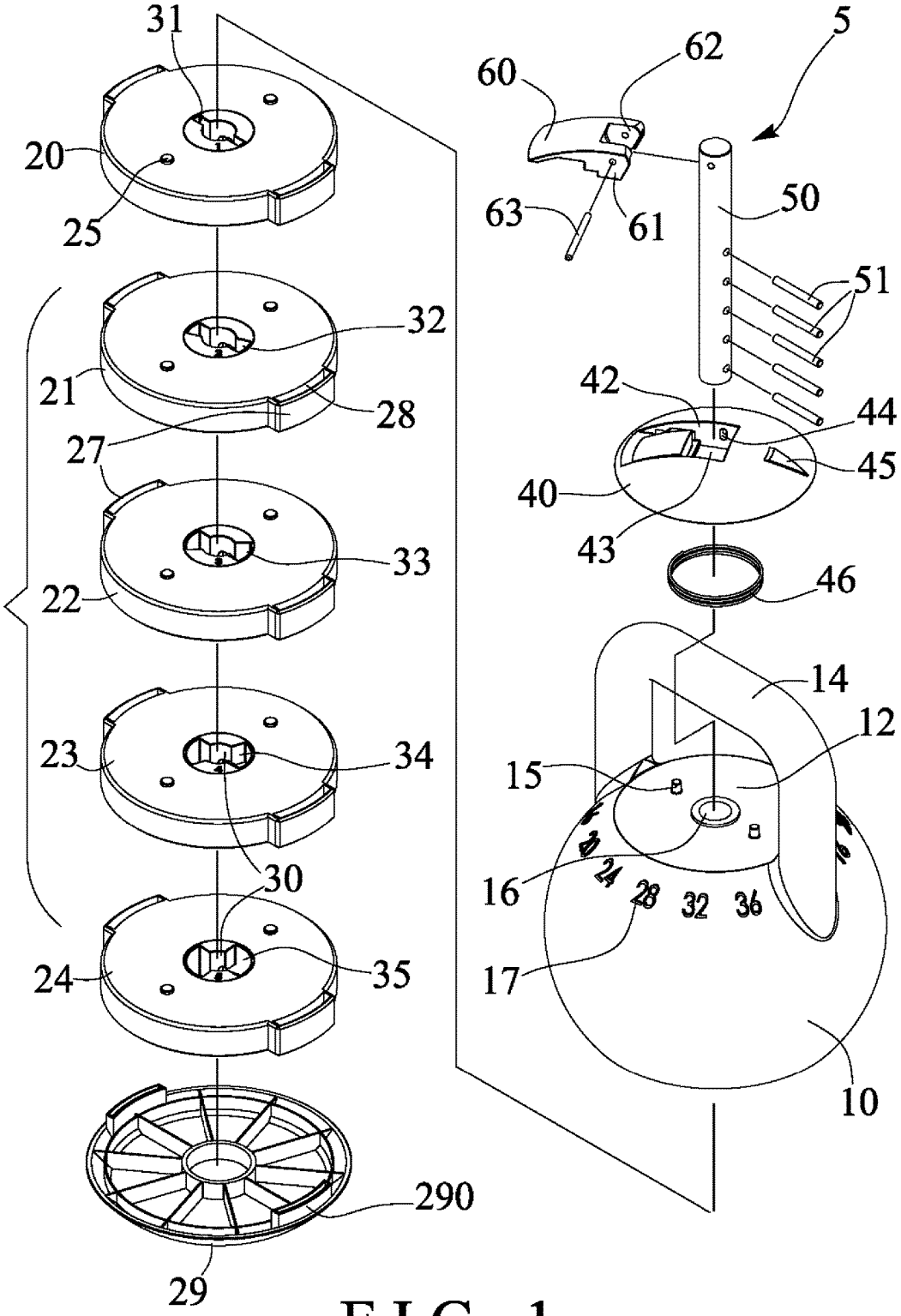
FIG. 1 is a partial exploded view of an adjustable exercise device or kettlebell in accordance with the present invention, as seen from the upper portion thereof.
Figure 2:
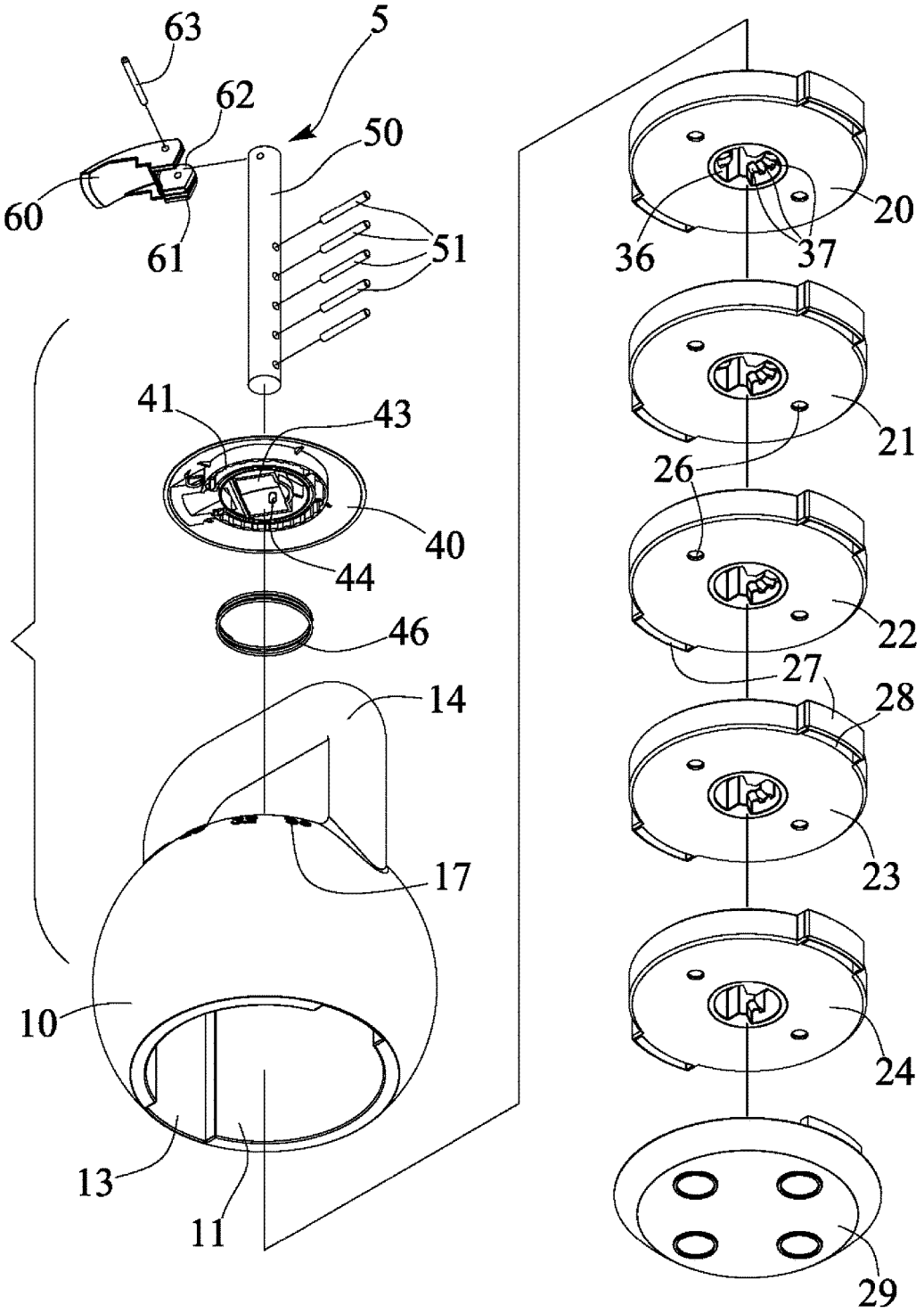
FIG. 2 is another partial exploded view of the adjustable kettlebell, as seen from the lower or bottom portion thereof.
Figure 3:
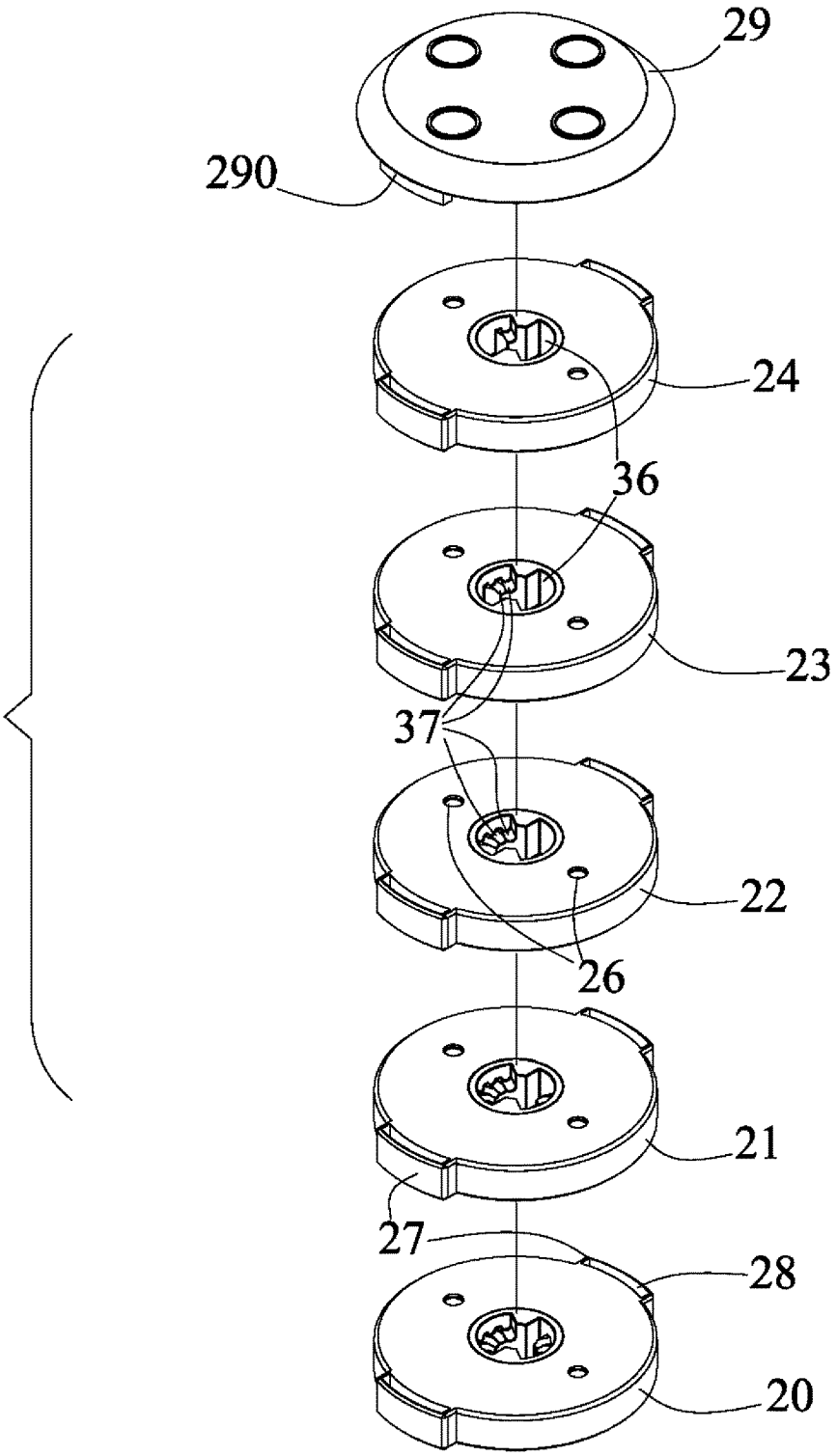
FIG. 3 is a further partial exploded view of the adjustable kettlebell, as seen from the lower or bottom portion thereof.
Figure 4:
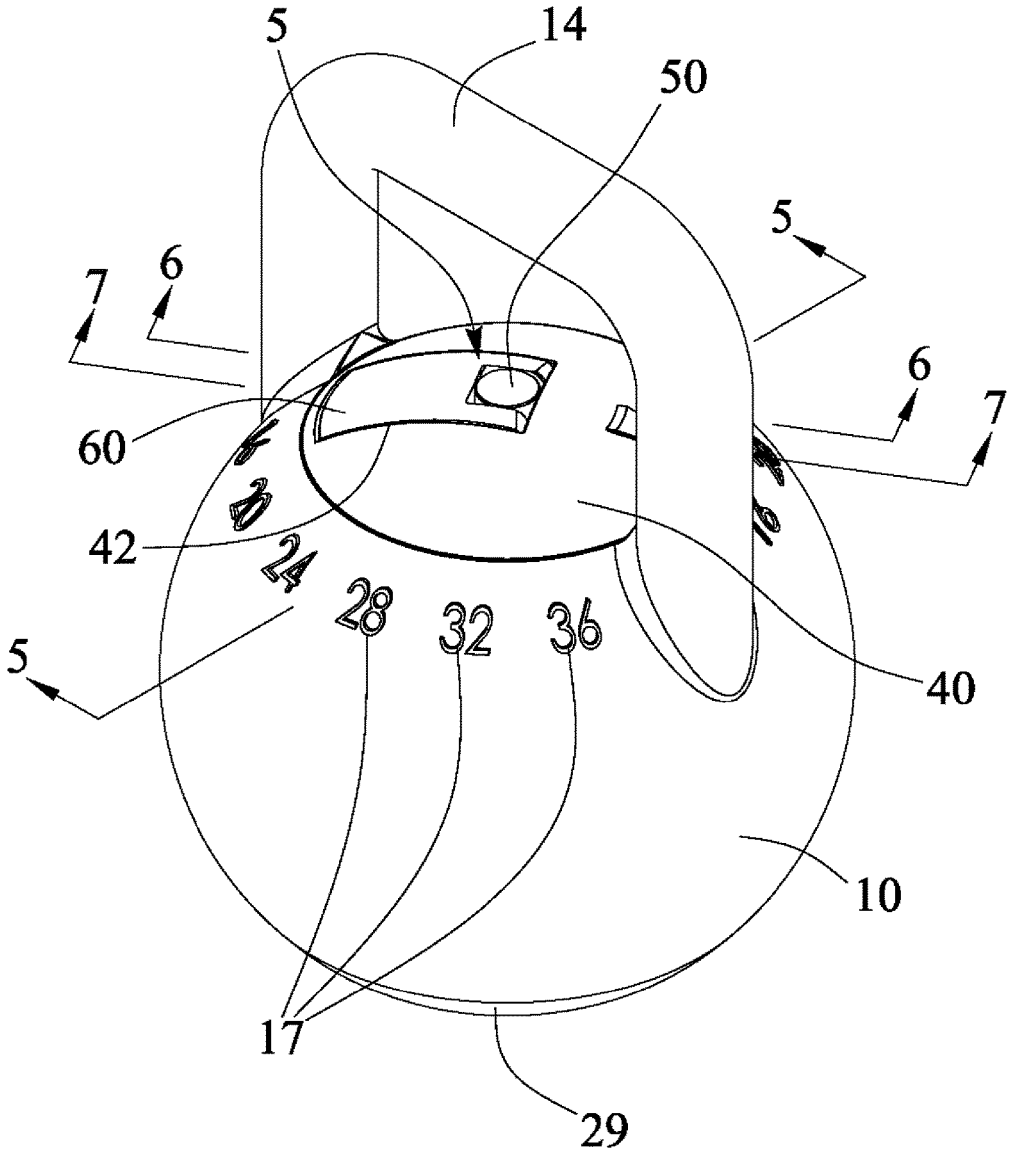
FIG. 4 is a perspective view of the adjustable kettlebell.
Figure 5:
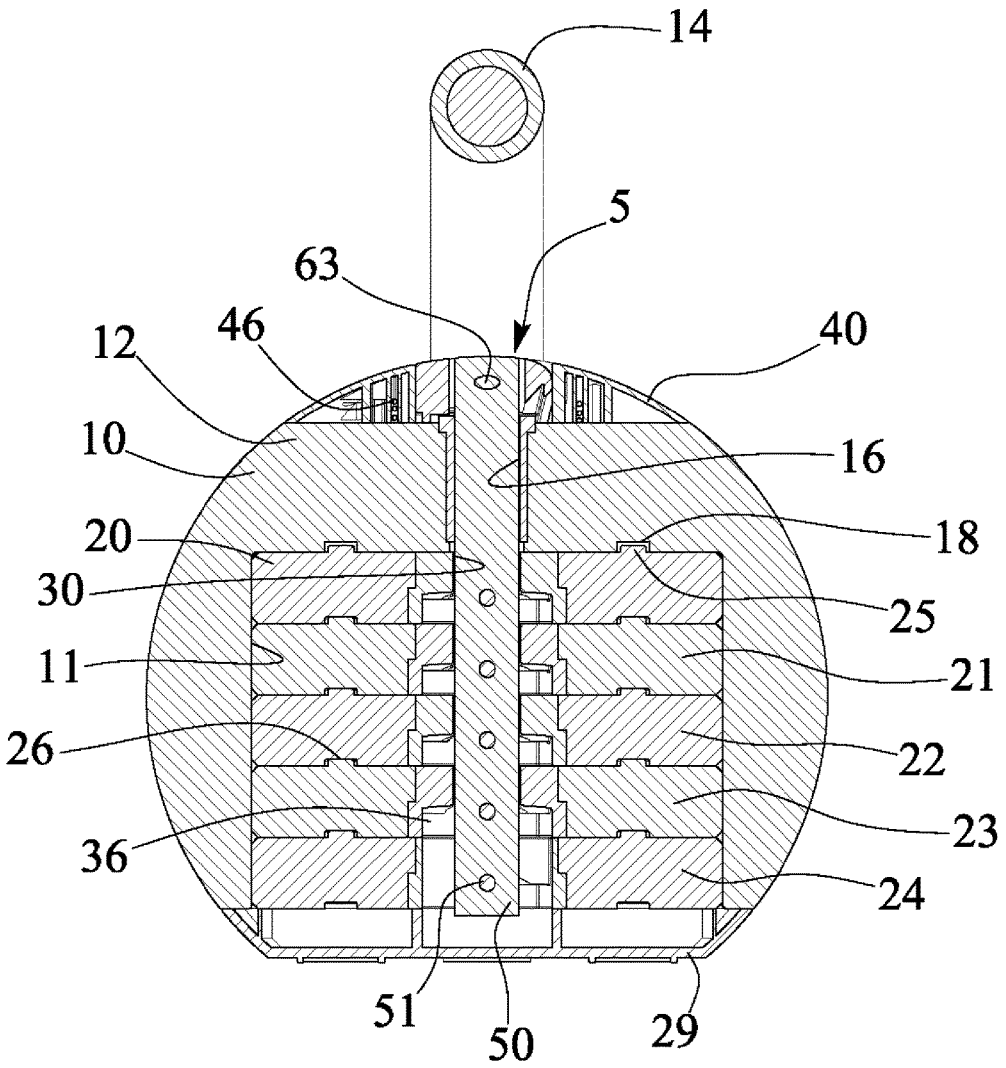
FIGS. 5, 6, 7 are cross sectional views of the adjustable kettlebell, taken along lines 5-5, 6-6, 7-7 of FIG. 4 respectively.
Figure 6:
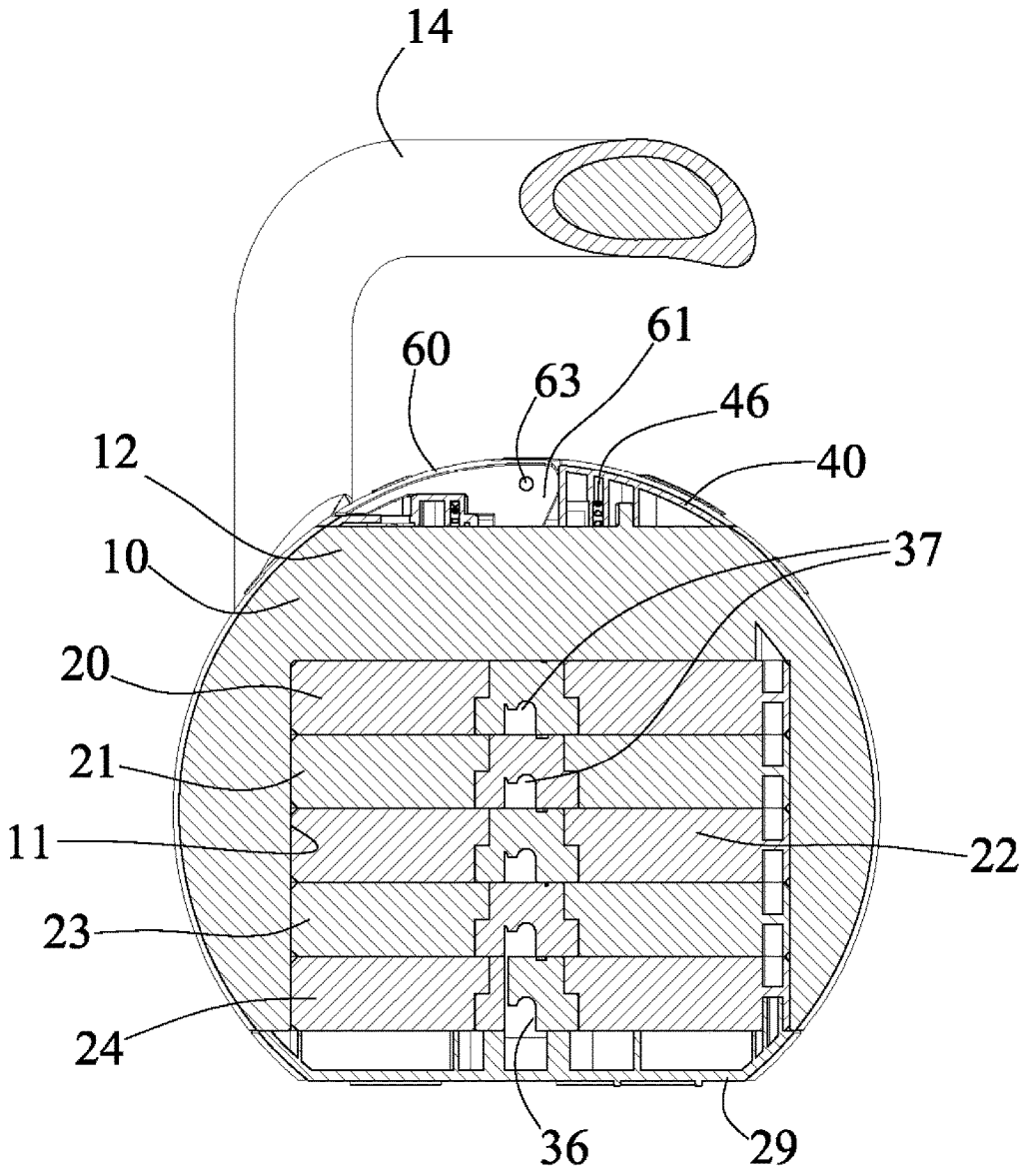

Referring to the drawings, and initially to FIGS. 1-6, an adjustable kettlebell or exercise device in accordance with the present invention comprises a kettlebell body or receptacle 10 including a compartment or chamber 11 formed therein, such as formed in the lower or bottom portion thereof (FIGS. 5-11), and formed or defined by an upper plate or wall 12, and faced or directed or opened downwardly for receiving or engaging with one or more weight plates or members 20, 21, 22, 23, 24 therein, and including one or more (such as two) guiding channels 13 formed therein and communicating with the chamber 11 of the receptacle 10, and including a handle bar or handle device 14 formed or provided on the upper portion thereof for being grasped or held by the user and for carrying or lifting or moving the receptacle 10 of the kettlebell device and for allowing the adjustable kettlebell device to be operated by the user.

The receptacle 10 includes one or more (such as two) keys or pegs 15 extended upwardly therefrom, such as extended upwardly from the flat upper wall 12 and spaced from each other, and includes a bore or passage 16 formed in the upper wall 12 and communicating with the chamber 11 of the receptacle 10, and includes a number of scales or indicia 17 formed or provided on the outer peripheral portion thereof for indicating the weight of the kettlebell device. The receptacle 10 further includes one or more (such as two) depressions or cavities or engaging members 18 formed in the lower or bottom portion of the upper wall 12 (FIG. 5) and communicating with the chamber 11 of the receptacle 10 for selectively engaging with the weight members 20-24 and for selectively anchoring or latching or retaining the weight members 20-24 to the receptacle 10.

For example, the weight members 20-24 each include one or more (such as two) pegs or keys 25 extended upwardly therefrom for selectively engaging with the cavities or engaging members 18 of the upper wall 12 of the receptacle 10 and for further anchoring or latching or retaining the weight members 20-24 to the receptacle 10, and each further include one or more (such as two) engaging members or cavities or recesses 26 formed therein, such as formed in the lower or bottom portion thereof for selectively engaging with the keys 25 of the other weight members 20-24 and for further anchoring or latching or retaining the weight members 20-24 together and for preventing the weight members 20-24 from pivoting or rotating relative to each other. The weight members 20-24 each further include one or more (such as two) engaging elements or protrusions 27 radially and oppositely extended outwardly therefrom for slidably engaging with the guiding channels 13 of the receptacle 10 and for further anchoring or retaining the weight members 20-24 to the receptacle 10 and for further preventing the weight members 20-24 from pivoting or rotating relative to the receptacle 10.

It is preferable that the protrusions 27 of the weight members 20-24 each further include a groove or engaging member 28 formed therein, such as formed and opened downwardly and upwardly through the respective protrusion 27 for selectively receiving or engaging with the projection 290 of a cap or cover 29, for example, the cover 29 includes one or more (such as two) projections 290 extended upwardly therefrom and spaced from each other for selectively engaging with the grooves or engaging members 28 of the protrusions 27 of the weight members 20-24 and for detachably or removably anchoring or retaining or securing the cover 29 to either of the weight members 20-24 with such as a force-fitted engagement. The weight members 20-24 each further include a central bore 30 formed therein for aligning with the passage 16 of the upper wall 12 of the receptacle 10 and for slidably receiving or engaging with a shaft 50 of an actuating or control device 5.

The weight members 20-24 each further include an opening 31, 32, 33, 34, 35 formed therein (FIG. 1), such as formed in the upper portion thereof and intersecting or communicating with the bore 30 of the respective weight member 20-24, and the opening 31 of the first or uppermost weight member 20 includes a smallest width or area, and the second weight member 21 includes an opening 32 having a relatively increased or greater width or area or angle than that of the opening 31 of the first or uppermost weight member 20, similarly, the opening 33 of the third weight member 22 includes a relatively increased or greater width or area or angle than that of the opening 31, 32 of the first two weight members 20, 21, the opening 34 of the fourth weight member 23 includes a relatively increased or greater width or area or angle than that of the opening 31, 32, 33 of the first three weight members 20, 21, 22, and the opening 35 of the fifth or last weight member 24 includes a relatively increased or greater width or area or angle than that of the opening 31, 32, 33, 34 of the first four weight members 20, 21, 22, 23.

The weight members 20-24 each further include a notch or space 36 formed therein (FIGS. 2, 3), such as formed in the lower or bottom portion thereof and communicating with the bore 30 and the opening 31-35 of the respective weight member 20-24, and each further include one or more socket openings or seats or depressions 37 also formed in the lower or bottom portion thereof and communicating with the bore 30 and the *notch or* space 36 of the respective weight member 20-24. For example, the fifth or last weight member 24 includes only one depression 37 formed therein, the fourth weight member 23 includes two depressions 37 formed therein, the third weight member 22 includes three depressions 37 formed therein, the second weight member 21 includes four depressions 37 formed therein, and the first or uppermost weight member 20 includes five depressions 37 formed therein and communicating with the bore 30 and the space 36 of the respective weight member 20-24.

Figure 8:
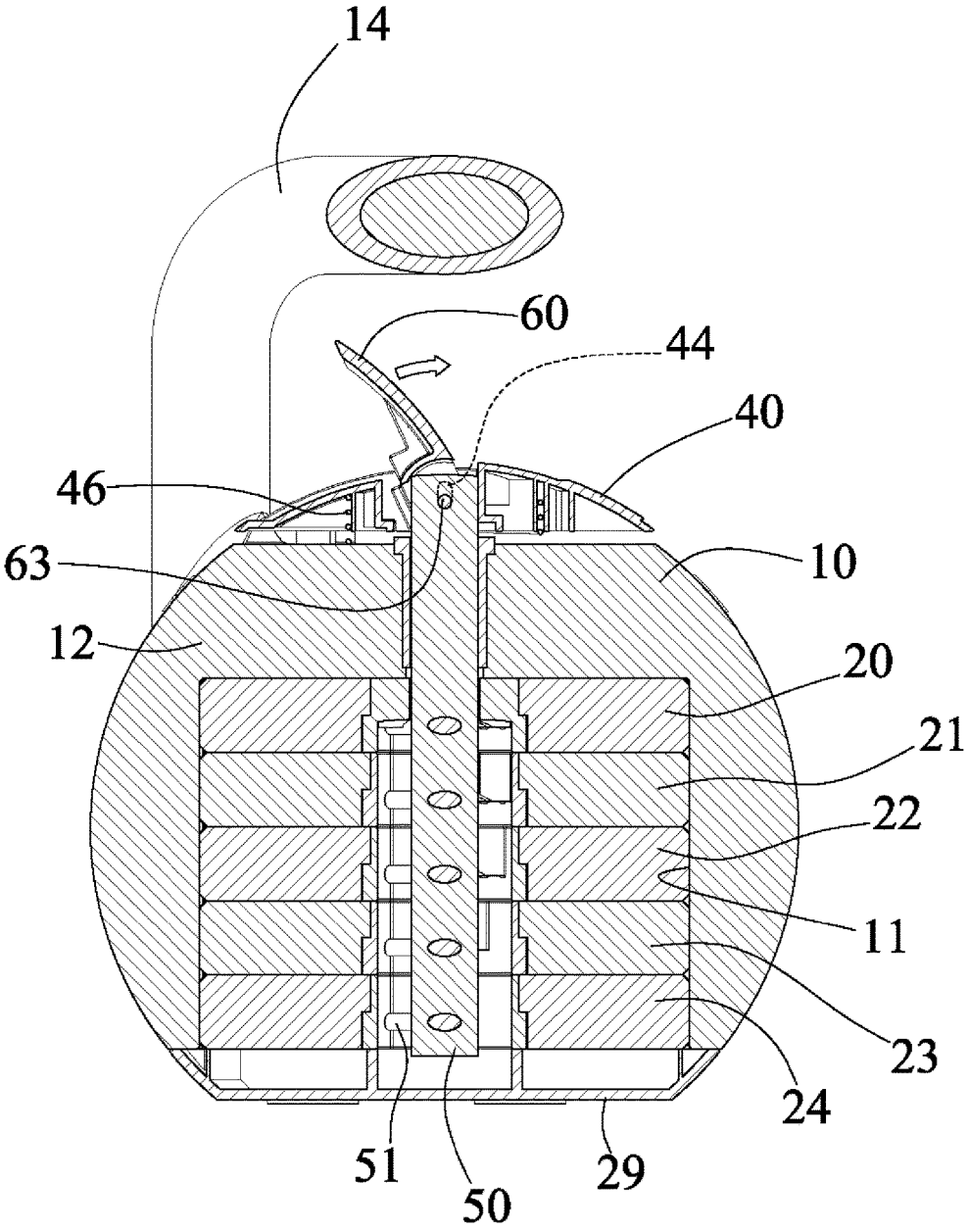
FIGS. 8, 9, 10, 11 are other cross sectional views of the adjustable kettlebell, similar to FIG. 7, illustrating the operation of the adjustable kettlebell.

A lid or cap 40 is disposed or provided on the top of the upper wall 12 of the receptacle 10, and includes a C-shaped circular or peripheral slot 41 formed therein (FIG. 2) for slidably receiving or engaging with the pegs 15 of the receptacle 10 for guiding and limiting the cap 40 to pivot or rotate relative to the receptacle 10. and includes a space or [notch] *recess* 42 formed therein, such as formed in the upper portion thereof, and an orifice 43 formed therein and communicating with the [notch] *recess* 42 of the cap 40 for aligning with the passage 16 of the upper wall 12 of the receptacle 10 and for slidably receiving or engaging with the shaft 50 of the actuating or control device 5, and an oblong hole 44 formed therein and communicating with the [notch] *recess* 42 of the cap 40, and a pointer or indicator 45 formed or provided on the upper portion of the cap 40, and a spring biasing member 46 disposed or provided or engaged between the cap 40 and the upper wall 12 of the receptacle 10 for selectively biasing and forcing or moving the cap 40 upwardly from the upper wall 12 of the receptacle 10 (FIG. 8).

The shaft 50 of the actuating or control device 5 is slidably engaged through the orifice 43 of the cap 40, and engaged through the passage 16 of the upper wall 12 of the receptacle 10 and engaged into the bore 30 of the weight members 20-24, and the control device 5 includes one or more (such as five) rods or pins 51 attached or mounted or secured to the shaft 50 and perpendicular to the shaft 50 and extended laterally and outwardly from the shaft 50 for selectively engaging through the opening 31-35 of the weight members 20-24 and for selectively engaging with the depressions 37 of the weight members 20-24 and for detachably or removably anchoring or retaining or securing the weight members 20-24 to the receptacle 10. An actuating lever or knob 60 includes a cam member 61 formed or provided on one end portion thereof and received or engaged in the [notch] *recess* 42 of the cap 40, and pivotally or rotatably attached or mounted or secured or coupled to the cap 40 with a pivot axle 63.

Figure 9:
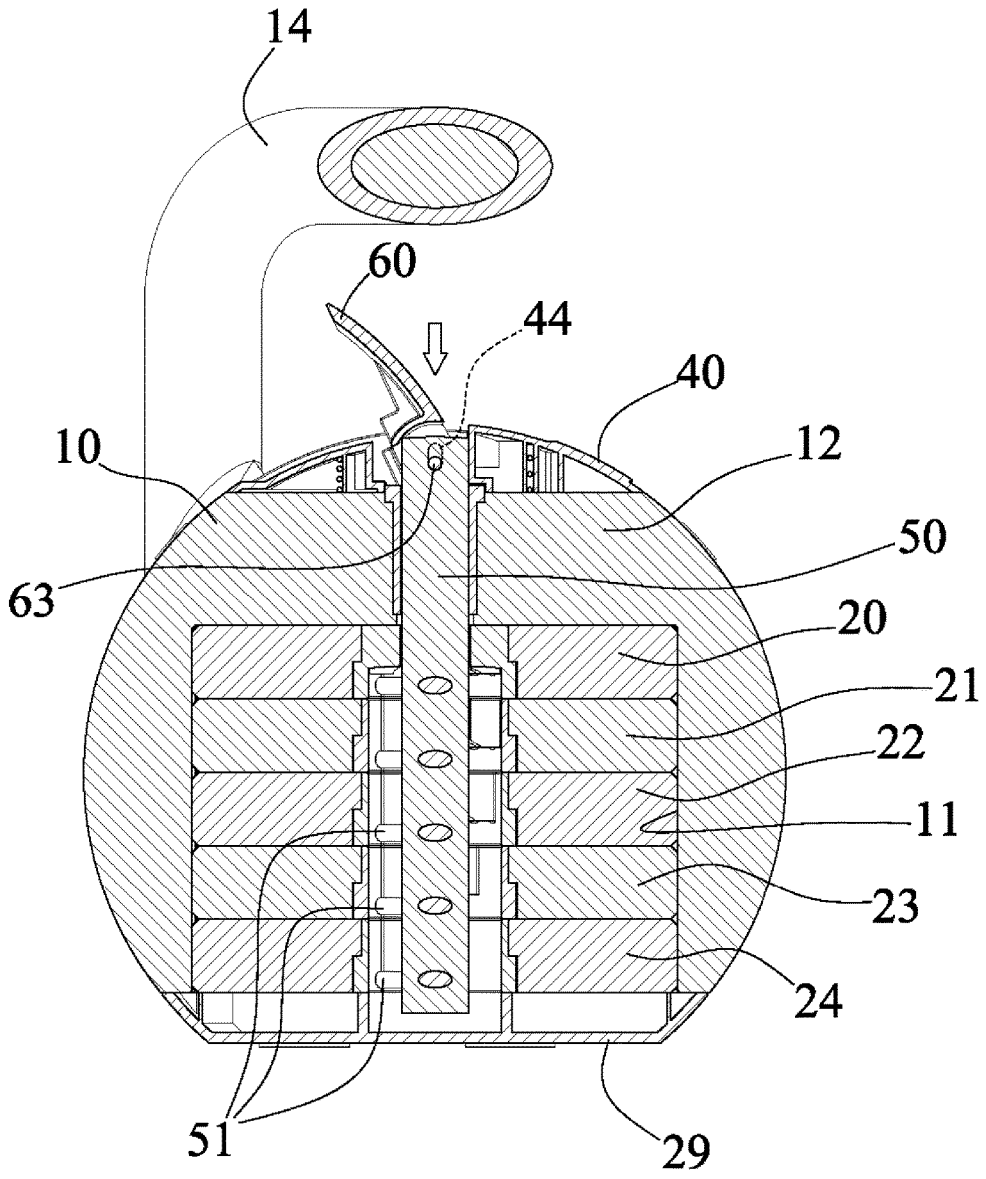
Figure 10:
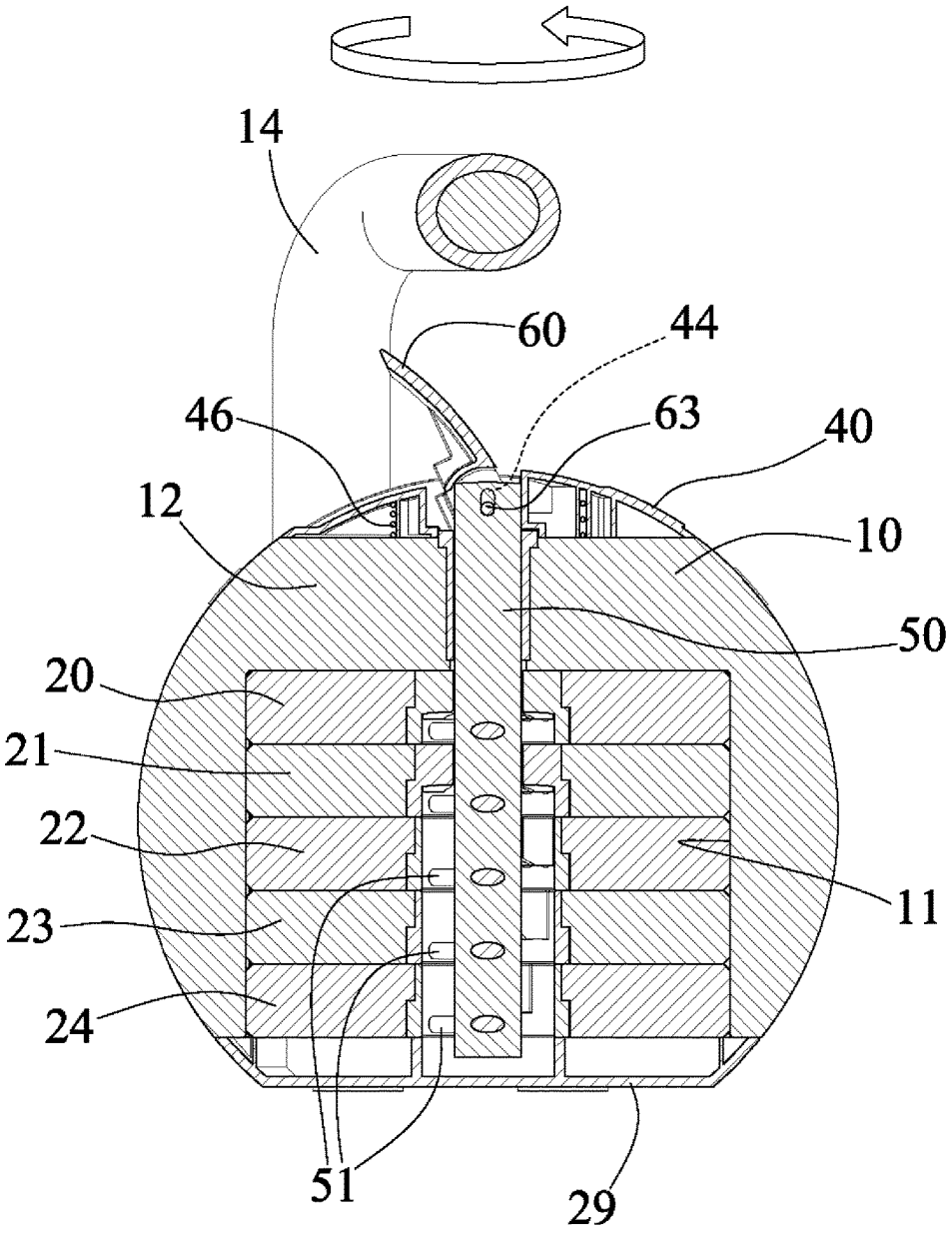

As shown in FIGS. 7-11, the pivot axle 63 is engaged through the cam member 61 of the actuating knob 60 and also engaged through the shaft 50 of the control device 5, and also engaged through the oblong hole 44 of the cap 40 for pivotally or rotatably attaching or mounting or securing or coupling the actuating knob 60 to the cap 40, and for allowing the shaft 50 to be moved up and down relative to the receptacle 10 and the weight members 20-24 with the actuating knob 60 selectively. For example, when the cam member 61 of the actuating knob 60 is pivoted upwardly away from the receptacle 10 and the cap 40, as shown in FIGS. 8-10, the shaft 50 and the pins 51 are released and allowed to be moved up and down relative to the receptacle 10 and the weight members 20-24, and also allowed to be pivoted or rotated relative to the receptacle 10 and the weight members 20-24, for allowing the pins 51 of the shaft 50 to be engaged with the depressions 37 of the weight members 20-24 selectively.

Figure 7:
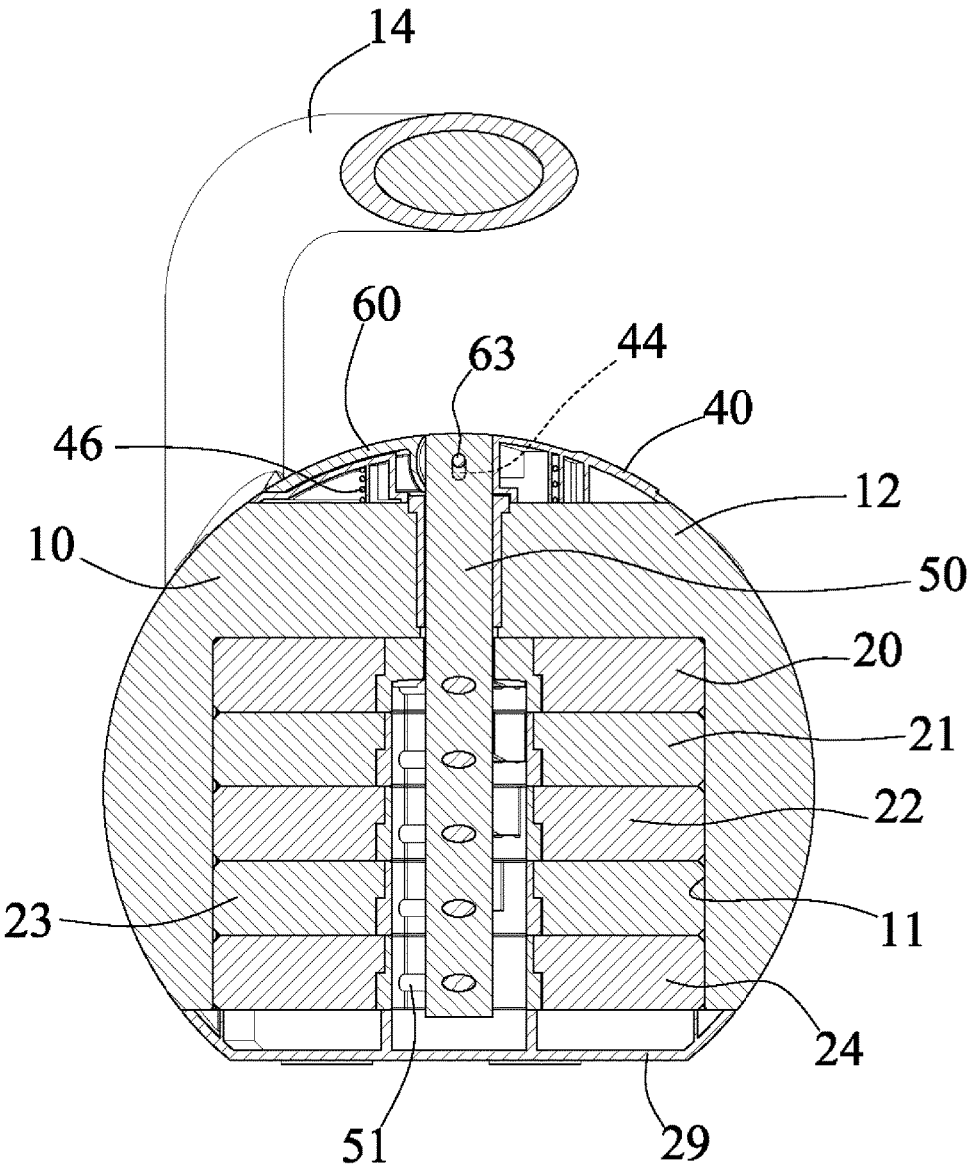
Figure 11:
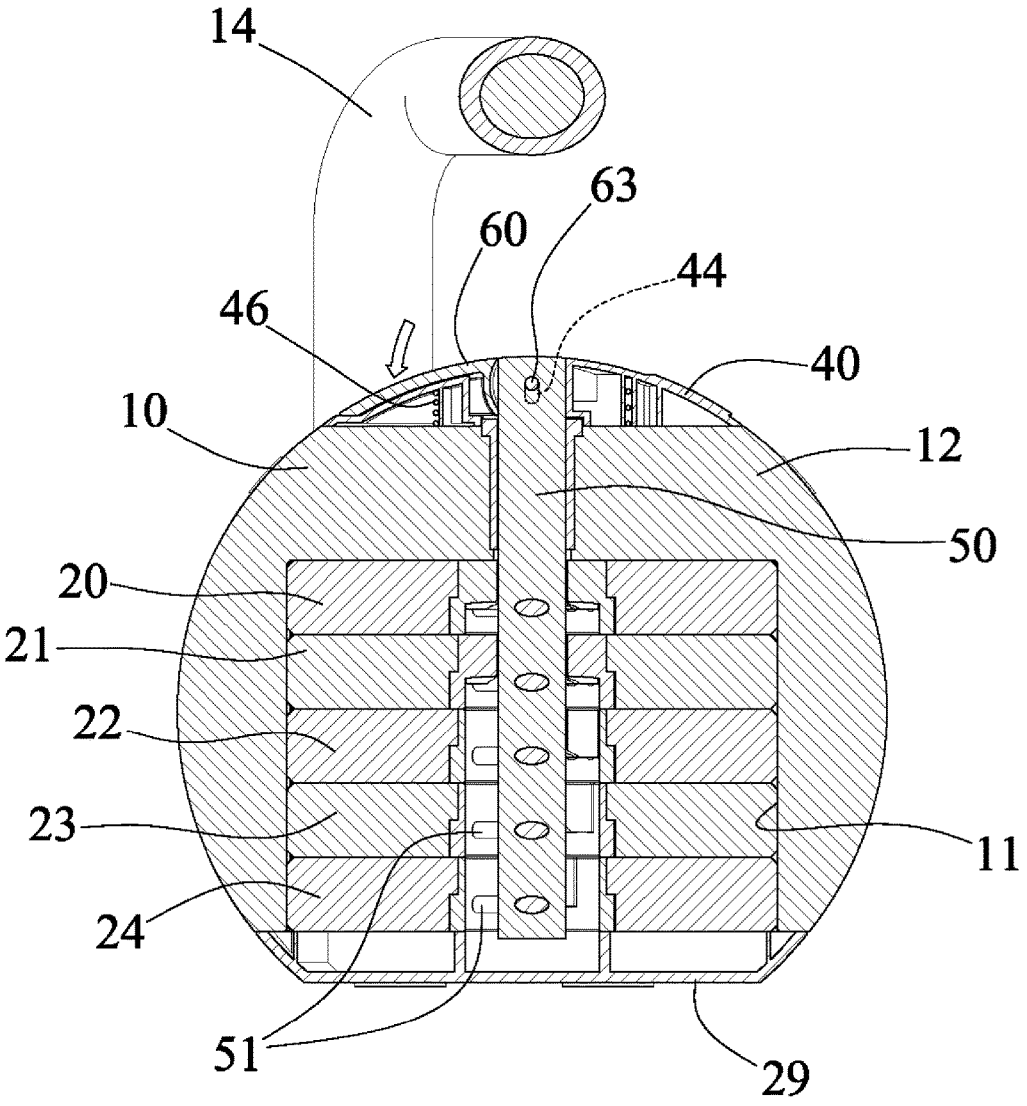
Figure 12:
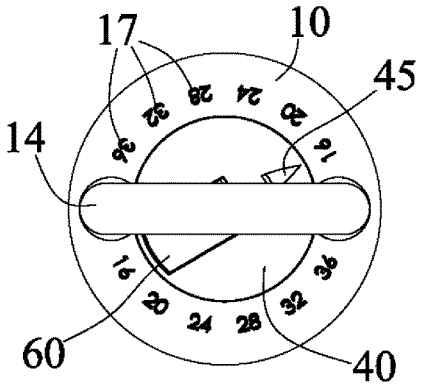
FIG. 12 is a top plan schematic view of the adjustable kettlebell.
Figure 13A:
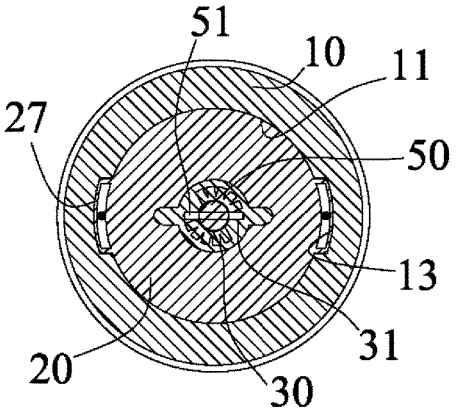
FIGS. 13A, 13B, 13C, 13D, 13E are lateral cross sectional views across the kettlebell body or outer receptacle and different weight members of the adjustable kettlebell respectively.
Figure 13B:
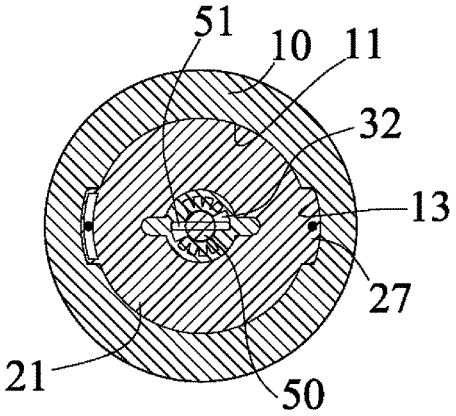
Figure 13C:
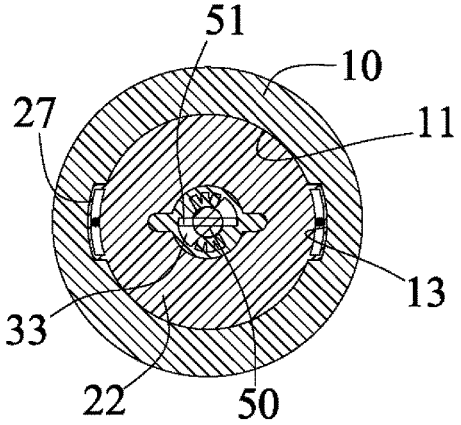
Figure 13D:
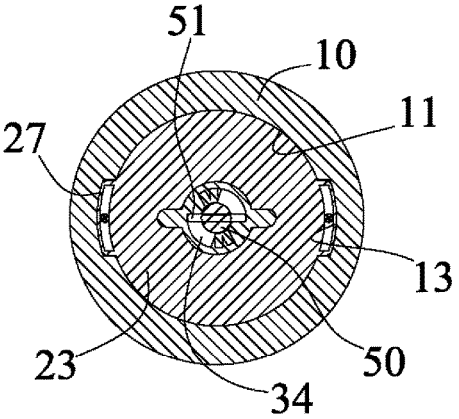
Figure 13E:
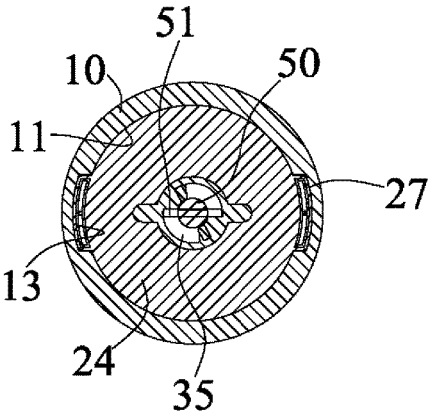
Figure 14A:
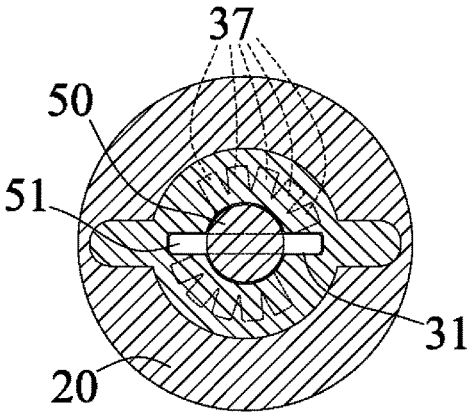
FIGS. 14A, 14B, 14C, 14D, 14E are enlarged lateral and partial cross sectional views similar to FIGS. 13A, 13B, 13C, 13D, 13E respectively.
Figure 14B:
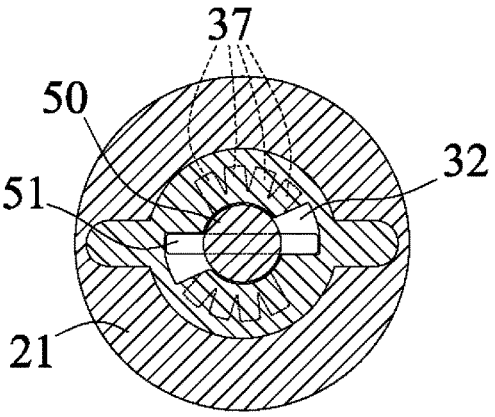
Figure 14C:
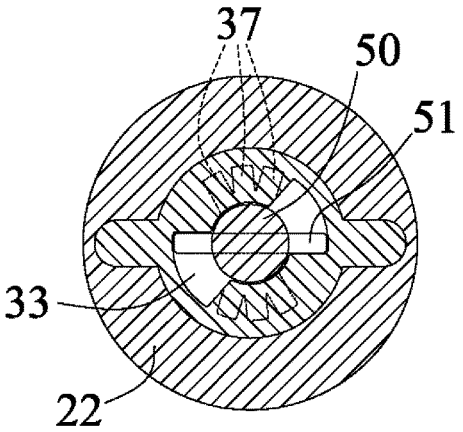
Figure 14D:
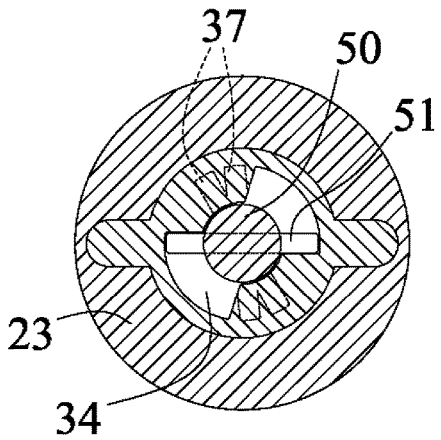
Figure 14E:
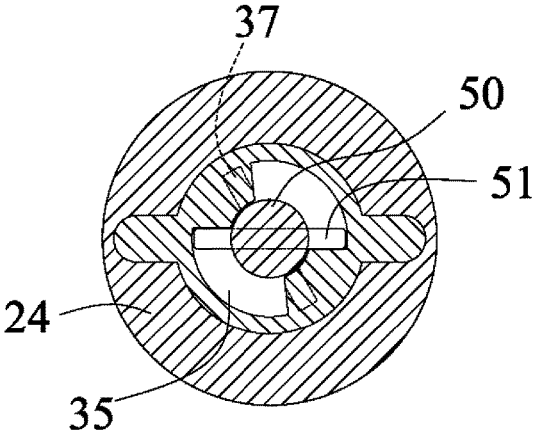
Figure 15:
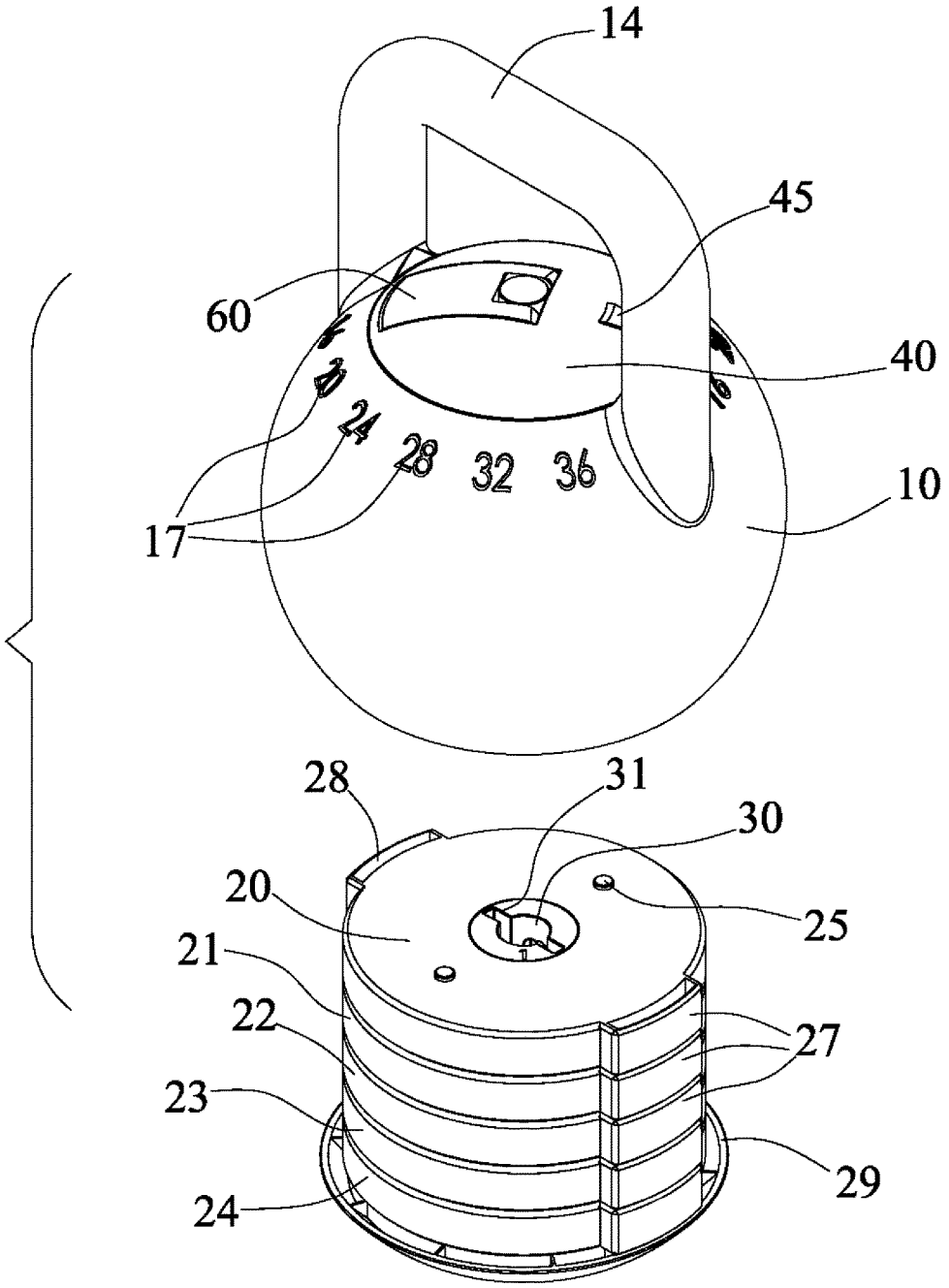
FIG. 15 is a further partial exploded view of the adjustable kettlebell illustrating the operation of the adjustable kettlebell as shown in FIGS. 12, 13A-13E, 14A-14E.
Figure 16:
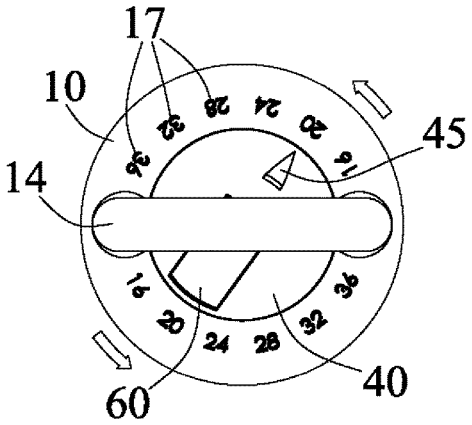
FIG. 16 is another top plan schematic view similar to FIG. 12, illustrating the operation of the adjustable kettlebell.
Figure 17A:
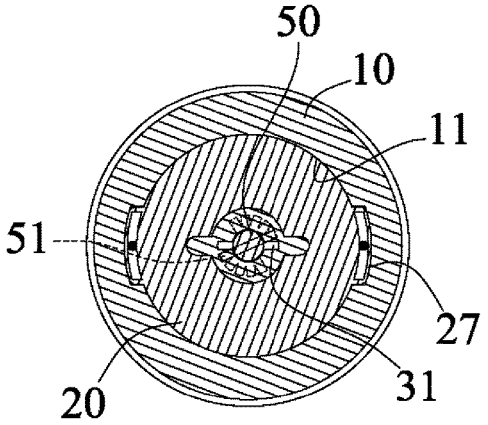
FIGS. 17A, 17B, 17C, 17D, 17E are lateral cross sectional views across the kettlebell body or outer receptacle and different weight members of the adjustable kettlebell respectively.
Figure 17B:
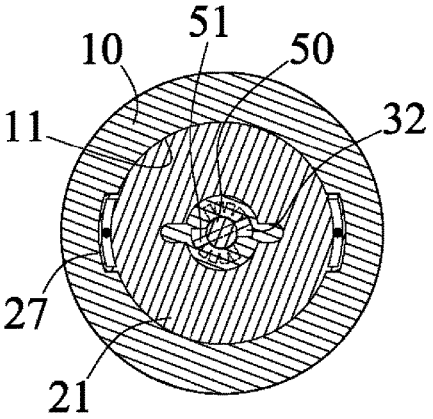
Figure 17C:
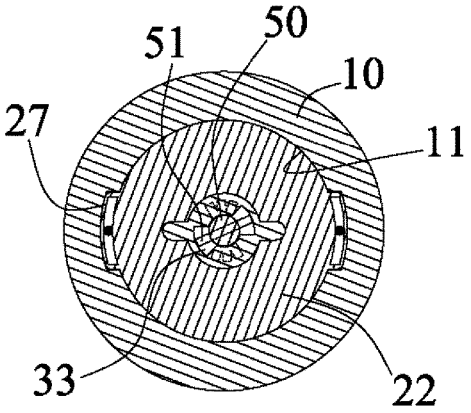
Figure 17D:
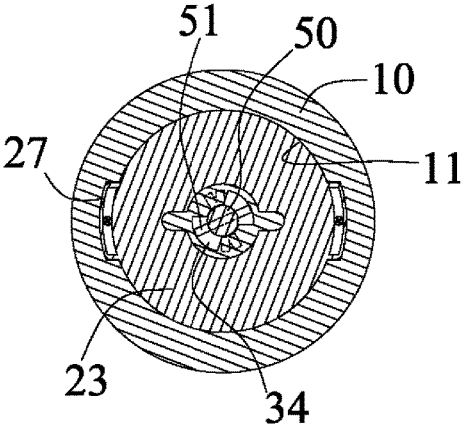
Figure 17E:
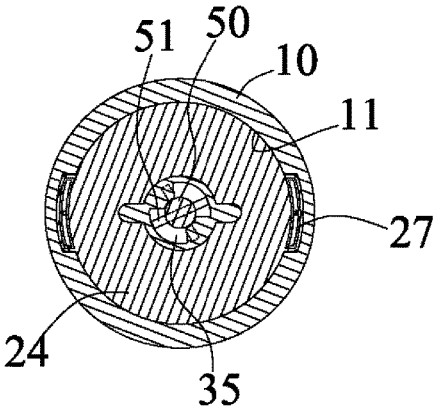
Figure 18A:
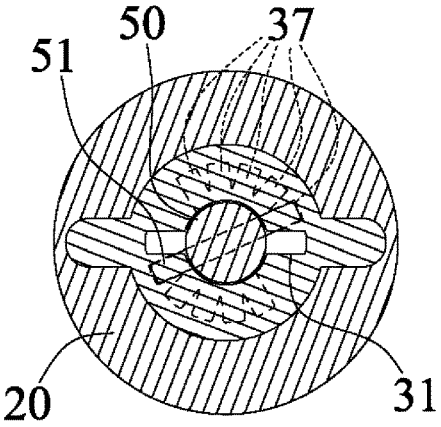
FIGS. 18A, 18B, 18C, 18D, 18E are enlarged lateral and partial cross sectional views similar to FIGS. 17A, 17B, 17C, 17D, 17E respectively.
Figure 18B:
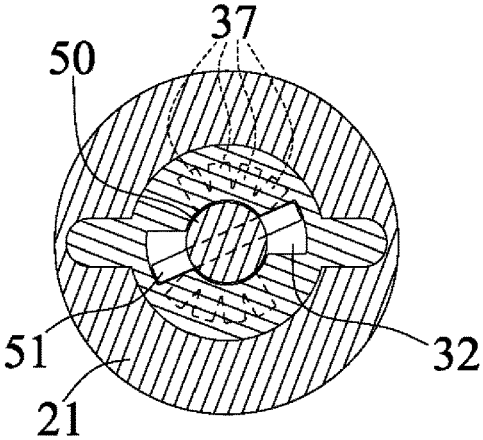
Figure 18C:
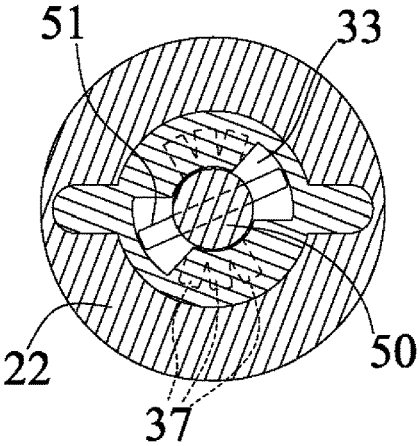
Figure 18D:
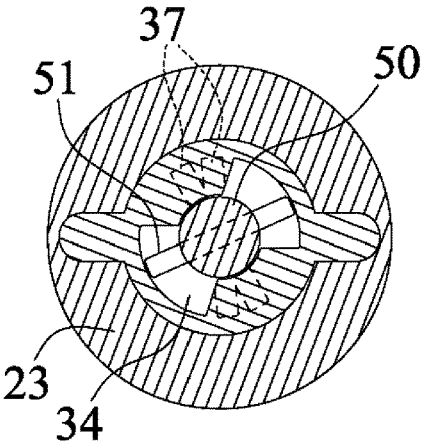
Figure 18E:
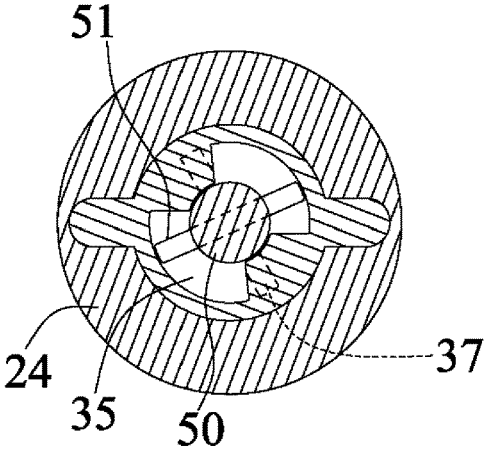
Figure 19:
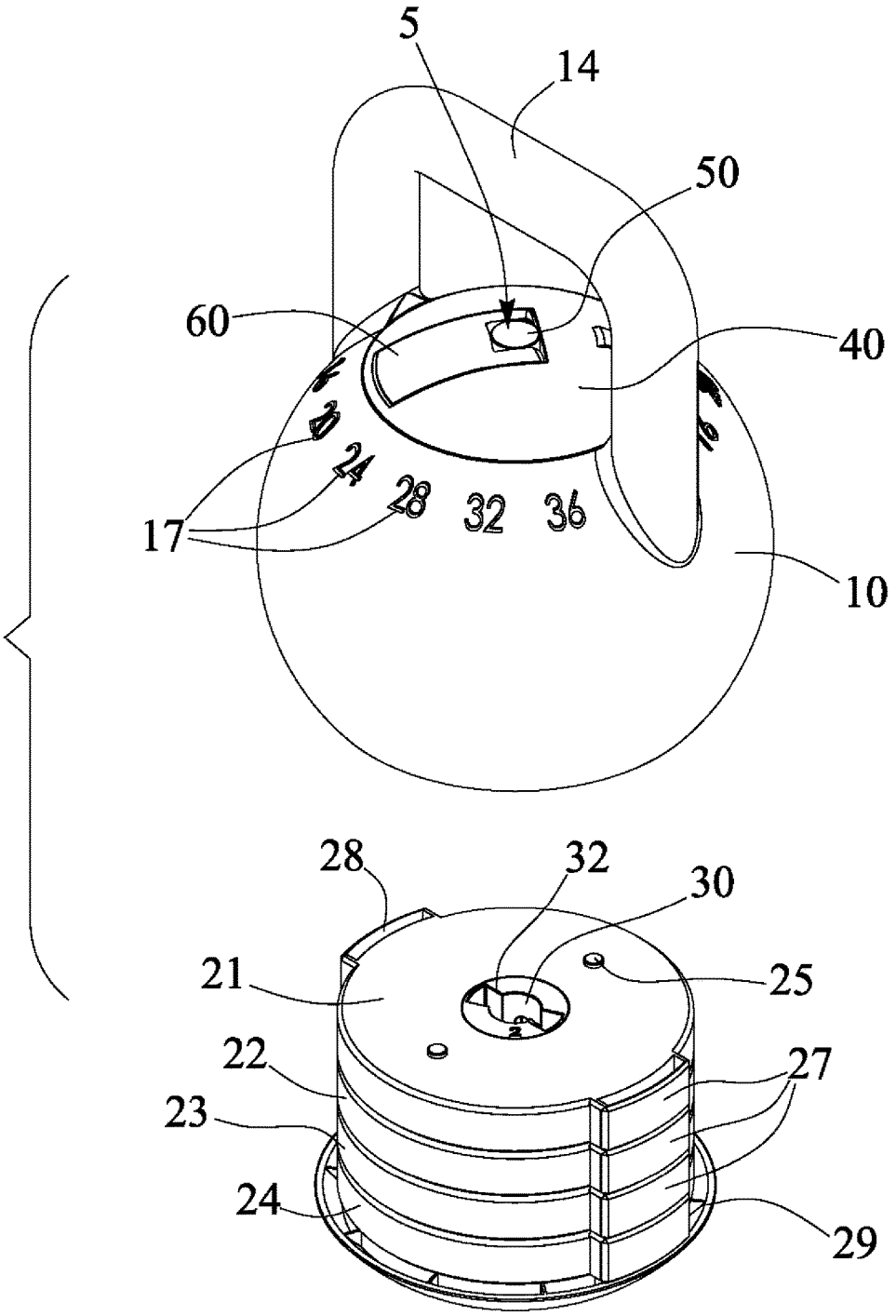
FIG. 19 is a further partial exploded view of the adjustable kettlebell illustrating the operation of the adjustable kettlebell as shown in FIGS. 16, 17A-17E, 18A-18E.
Figure 20:
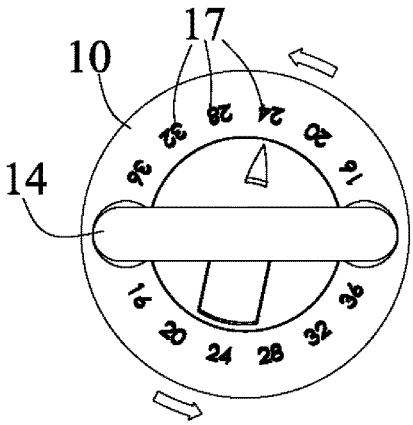
FIG. 20 is a further top plan schematic view similar to FIGS. 12 and 16, illustrating the operation of the adjustable kettlebell.
Figure 21A:
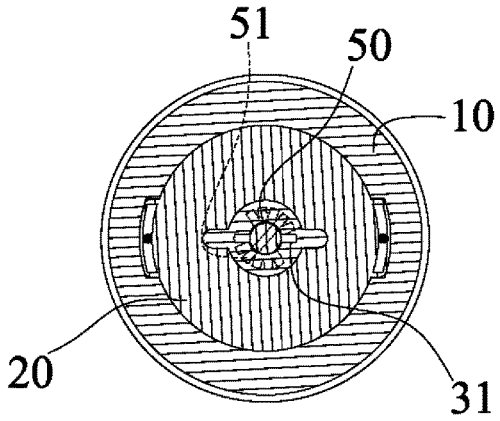
FIGS. 21A, 21B, 21C, 21D, 21E are lateral cross sectional views across the kettlebell body or outer receptacle and different weight members of the adjustable kettlebell respectively.
Figure 21B:
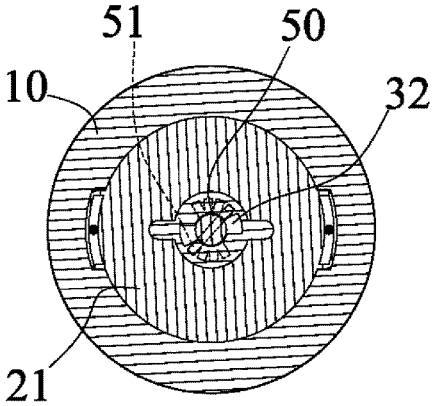
Figure 21C:
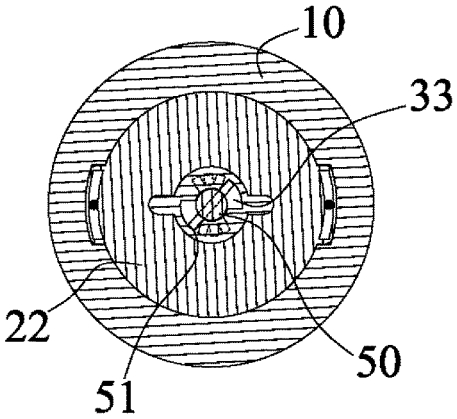
Figure 21D:
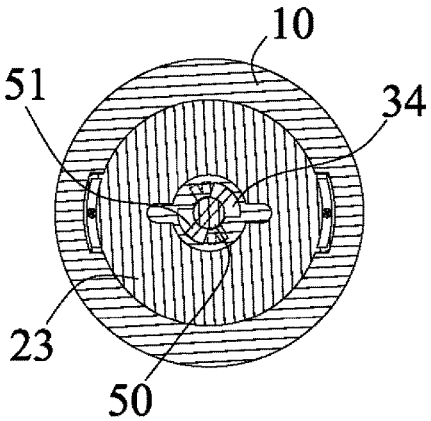
Figure 21E:
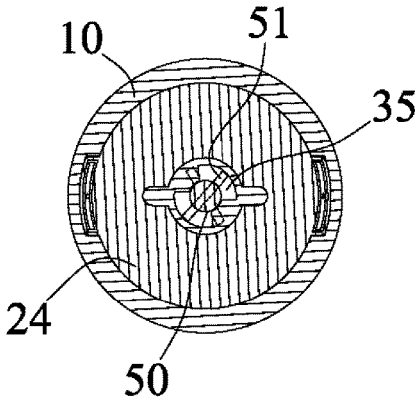
Figure 22A:
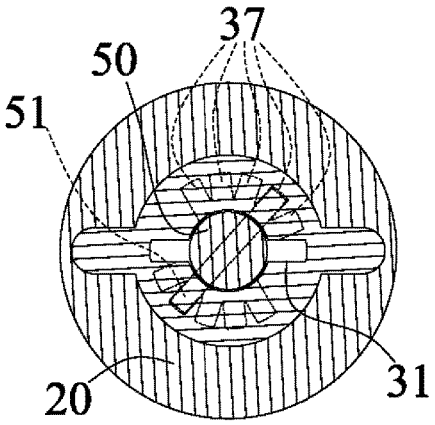
FIGS. 22A, 22B, 22C, 22D, 22E are enlarged lateral and partial cross sectional views similar to FIGS. 21A, 21B, 21C, 21D, 21E respectively.
Figure 22B:
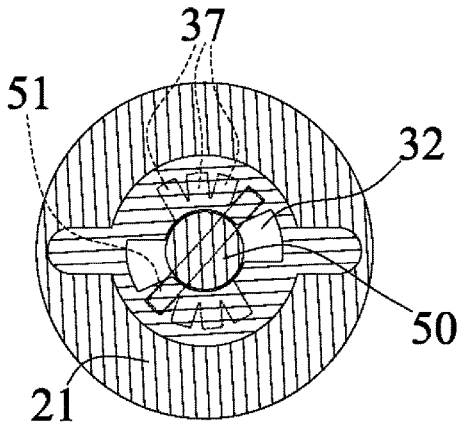
Figure 22C:
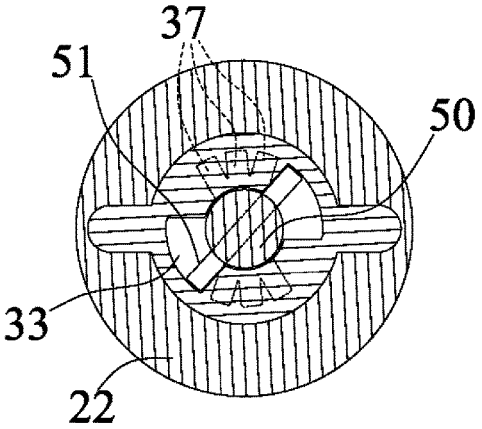
Figure 22D:
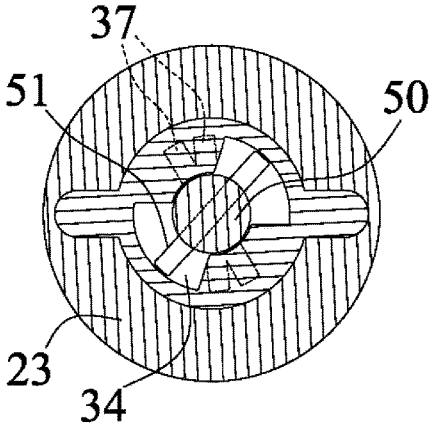
Figure 22E:
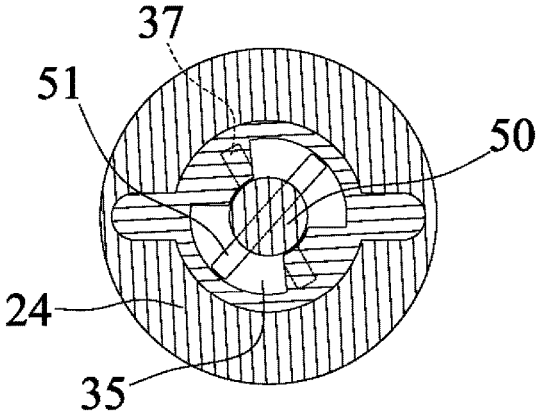
Figure 23:
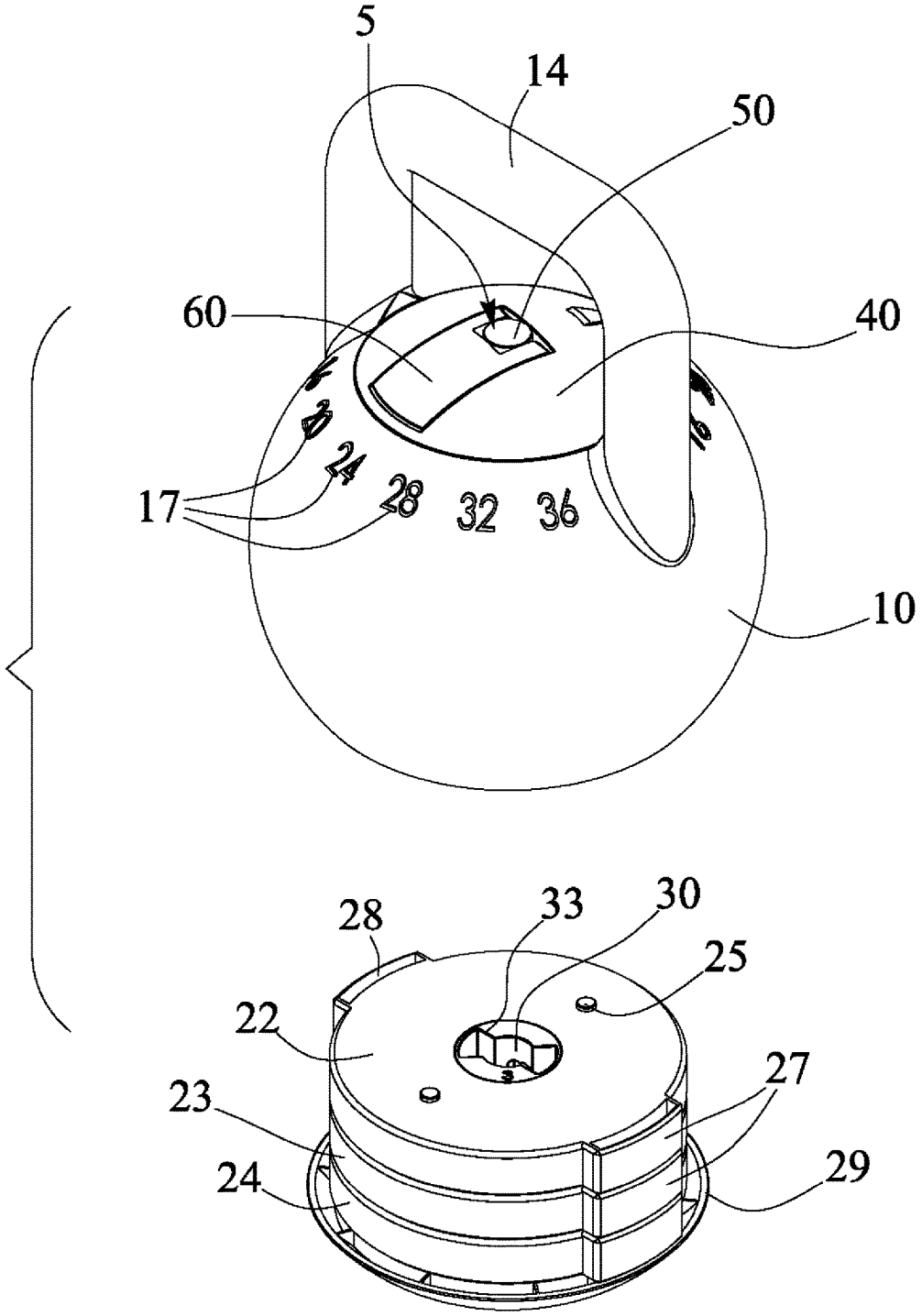
FIG. 23 is a further partial exploded view of the adjustable kettlebell illustrating the operation of the adjustable kettlebell as shown in FIGS. 20, 21A-21E, 22A-22E.
Figure 24:
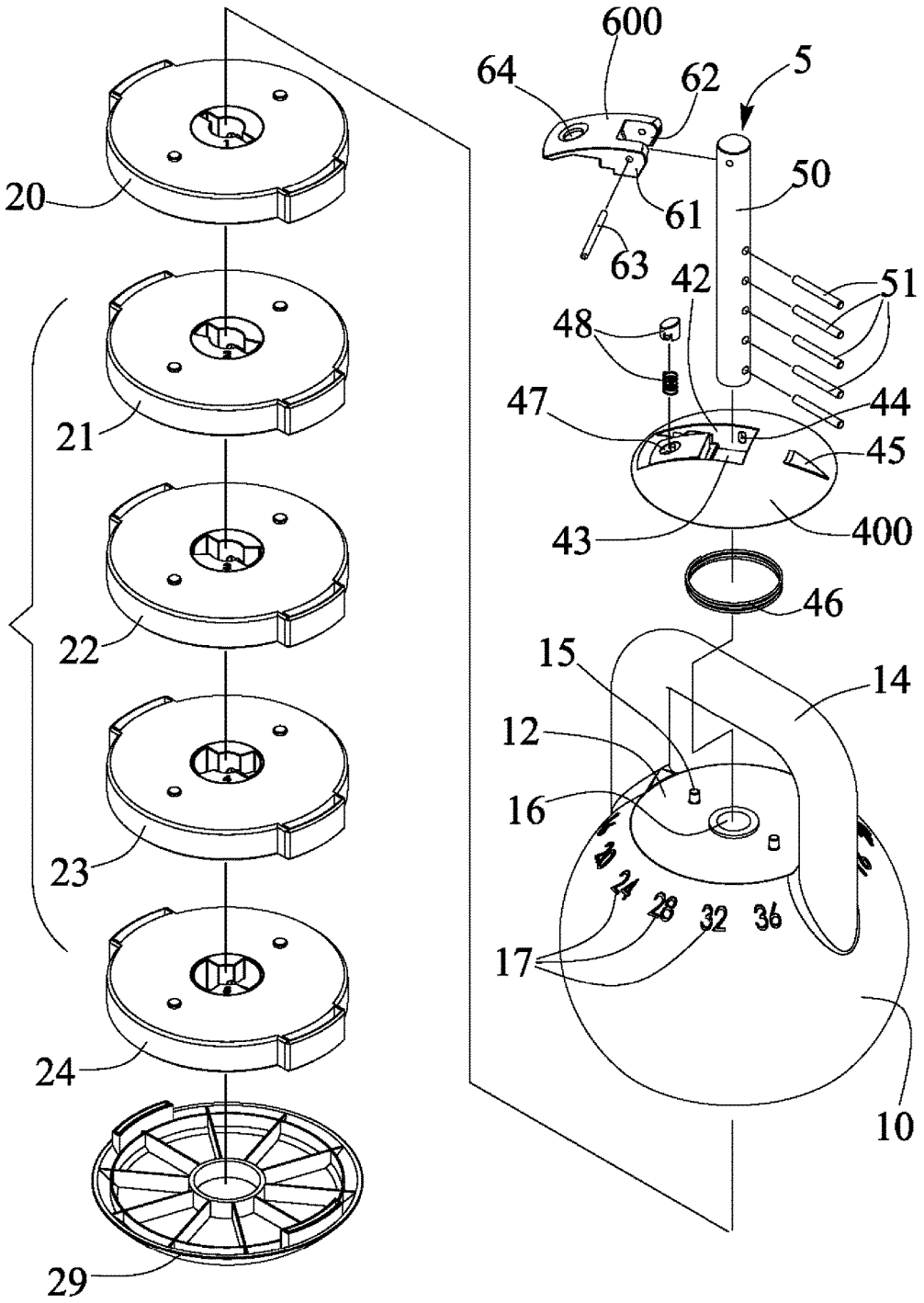
FIGS. 24, 25 are other partial exploded views similar to FIGS. 1 and 2, illustrating the other arrangement of the adjustable kettlebell.
Figure 25:
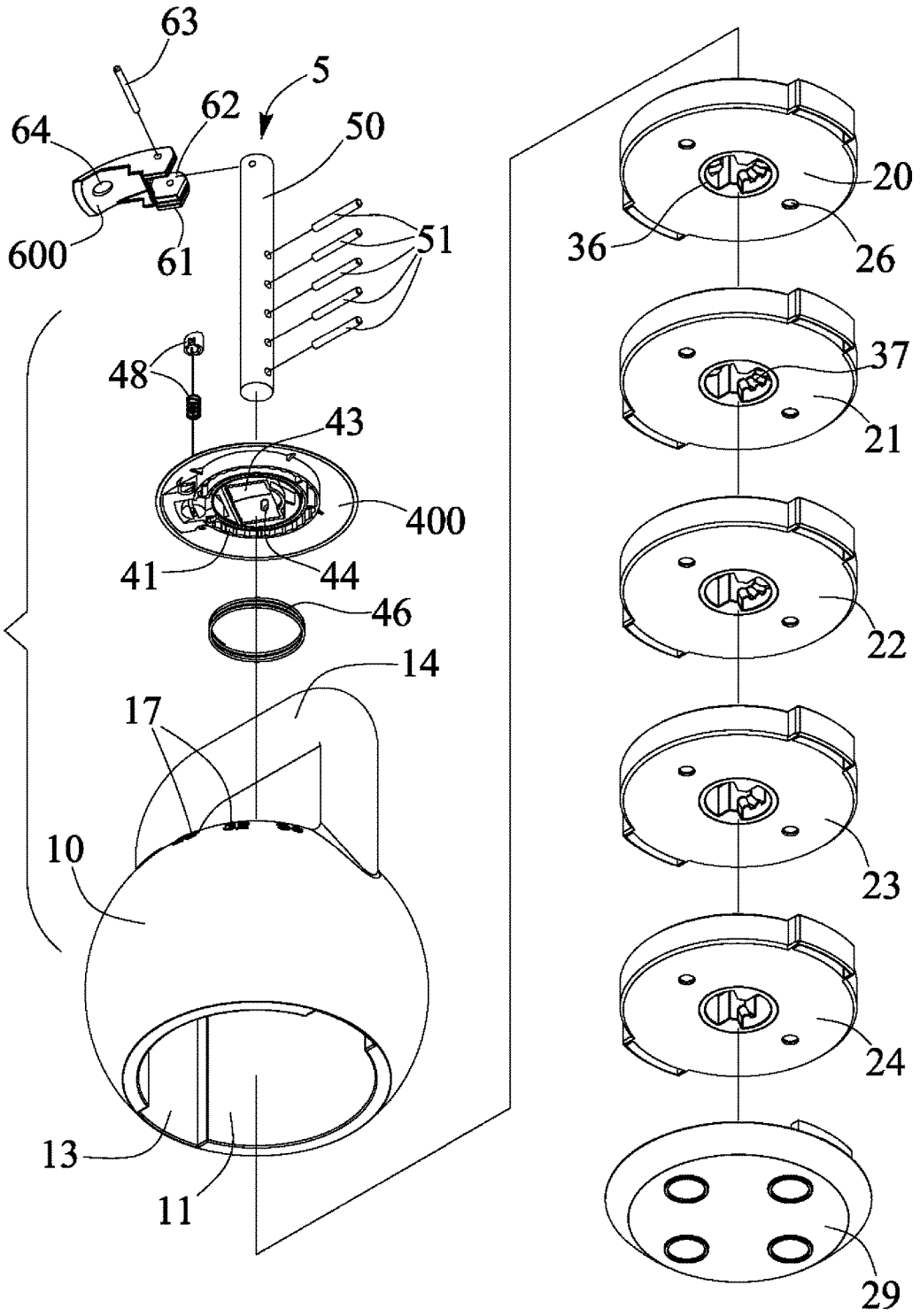
Figure 26:
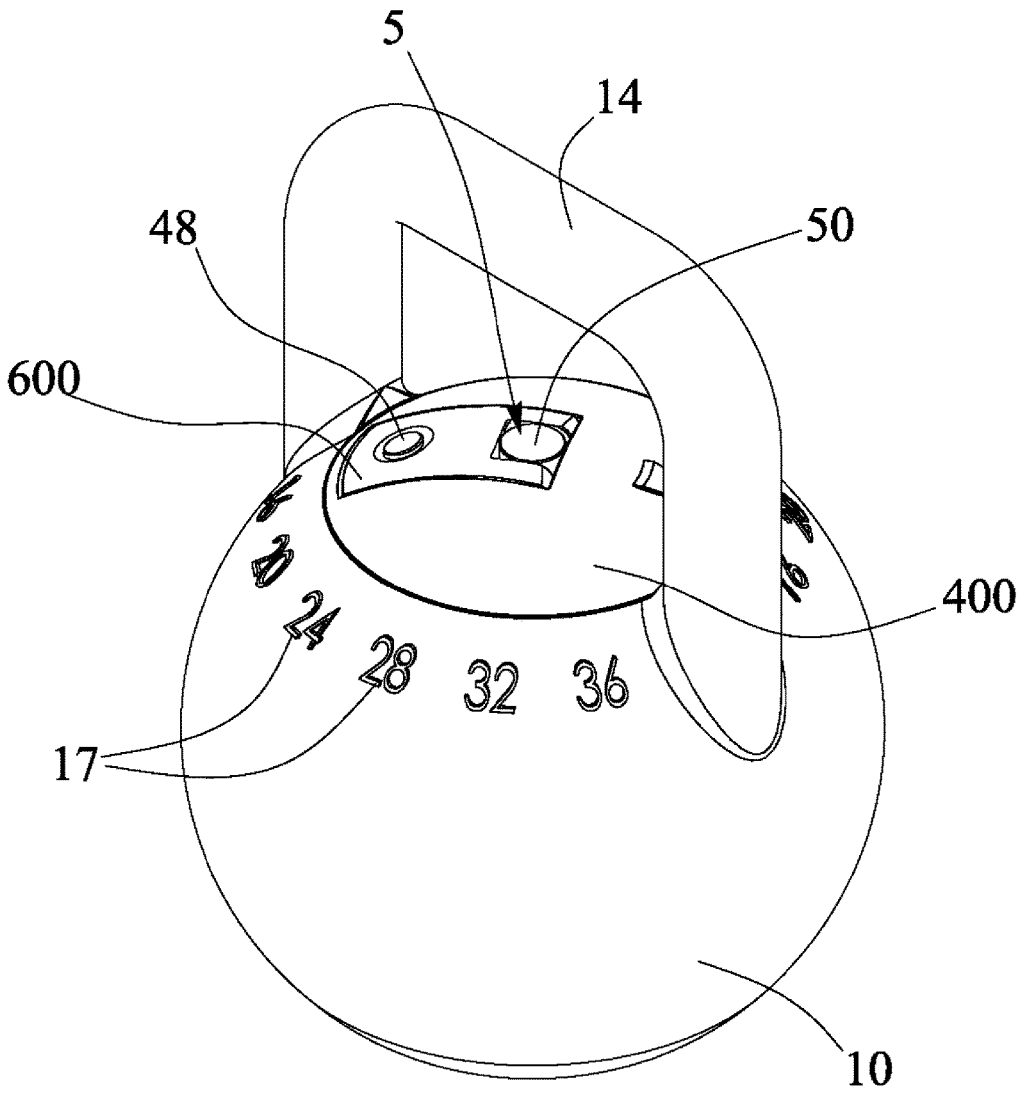
FIG. 26 is a perspective view of the adjustable kettlebell as shown in FIGS. 24, 25.
Figure 27:
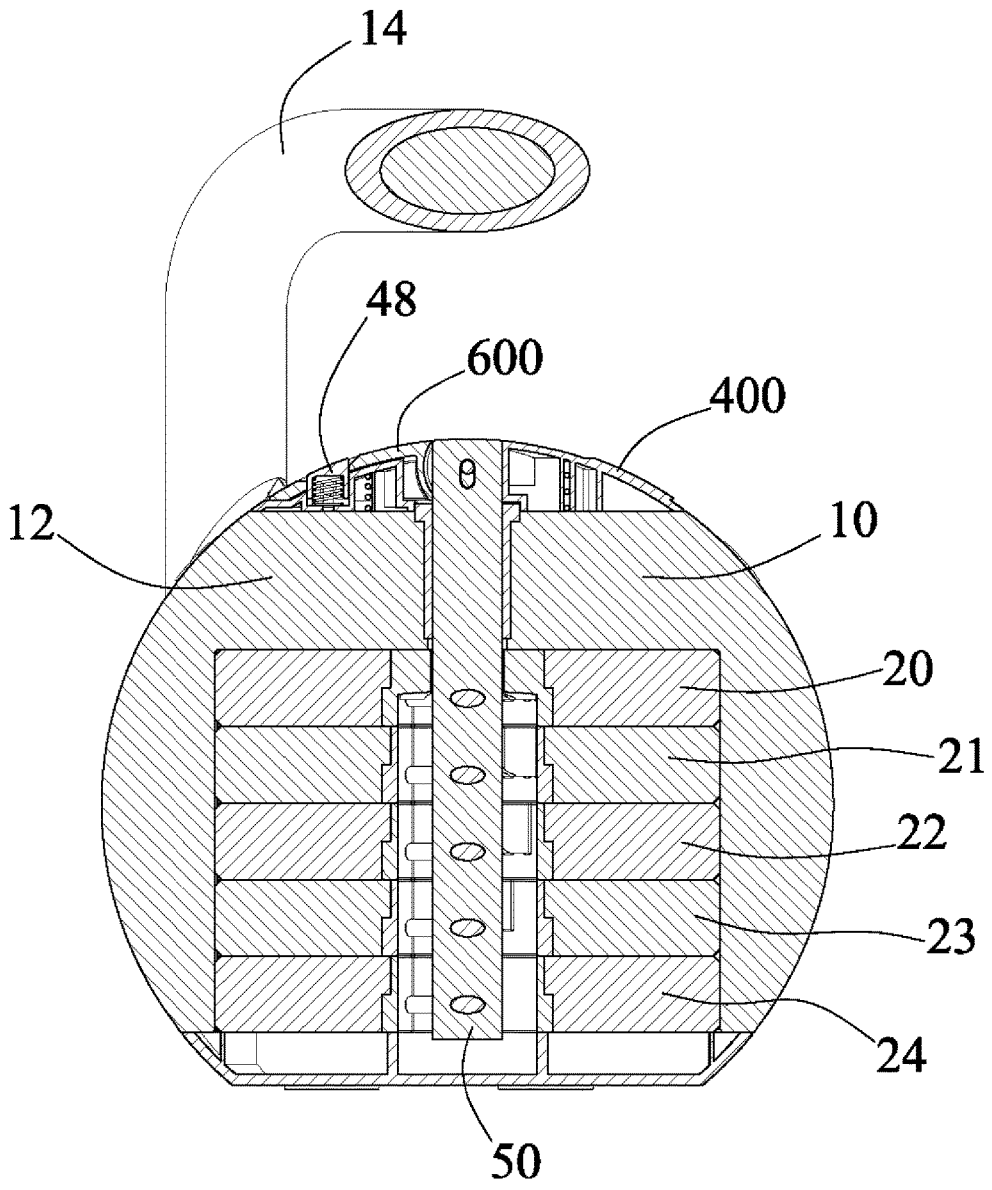
FIGS. 27, 28, 29 are cross sectional views of the adjustable kettlebell as shown in FIGS. 24-26.
Figure 28:
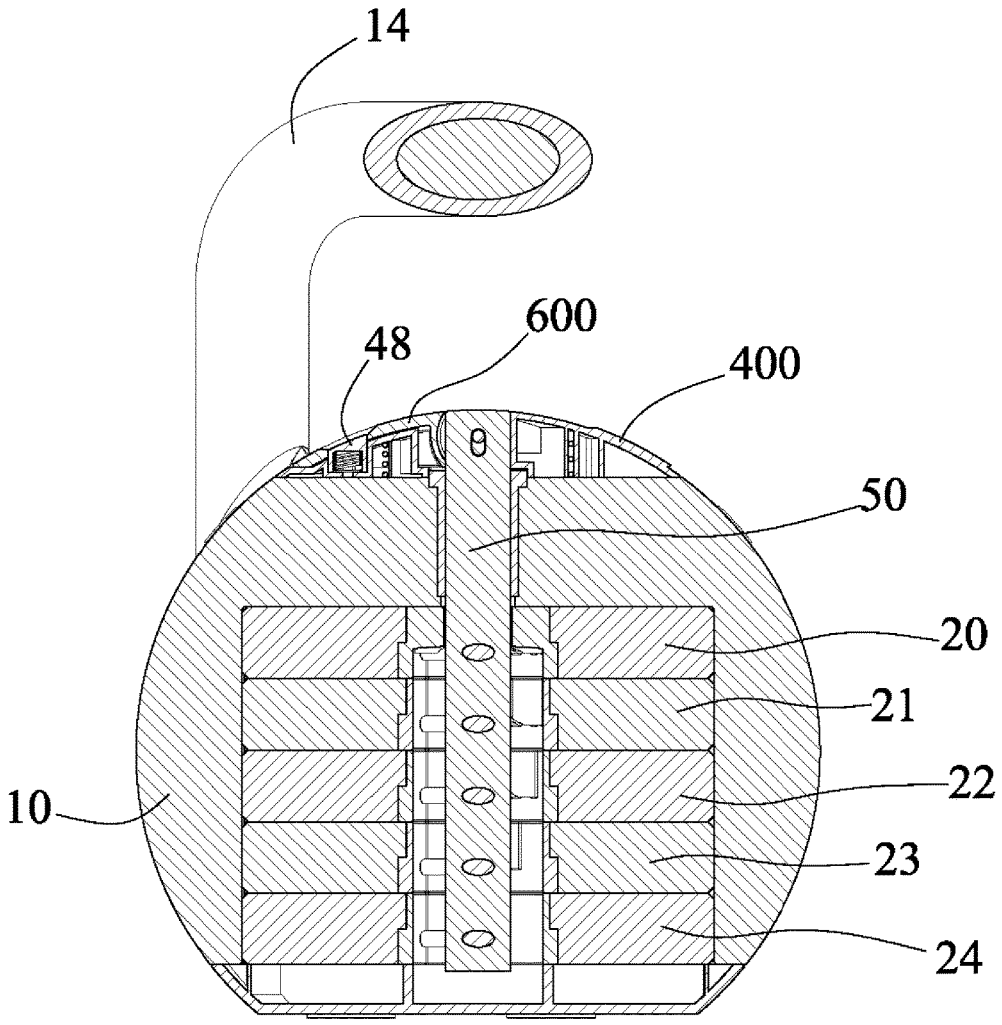
Figure 29:
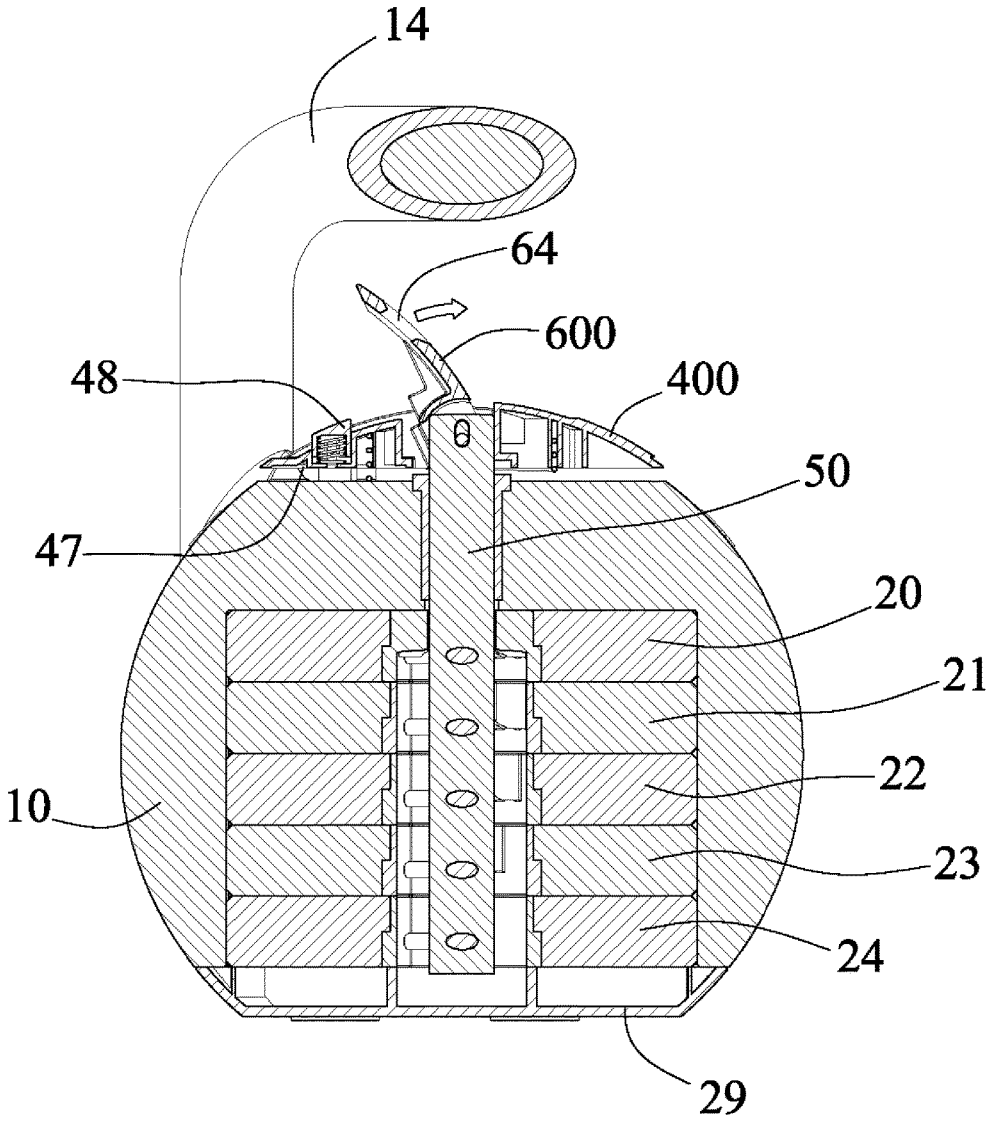
Figure 30:
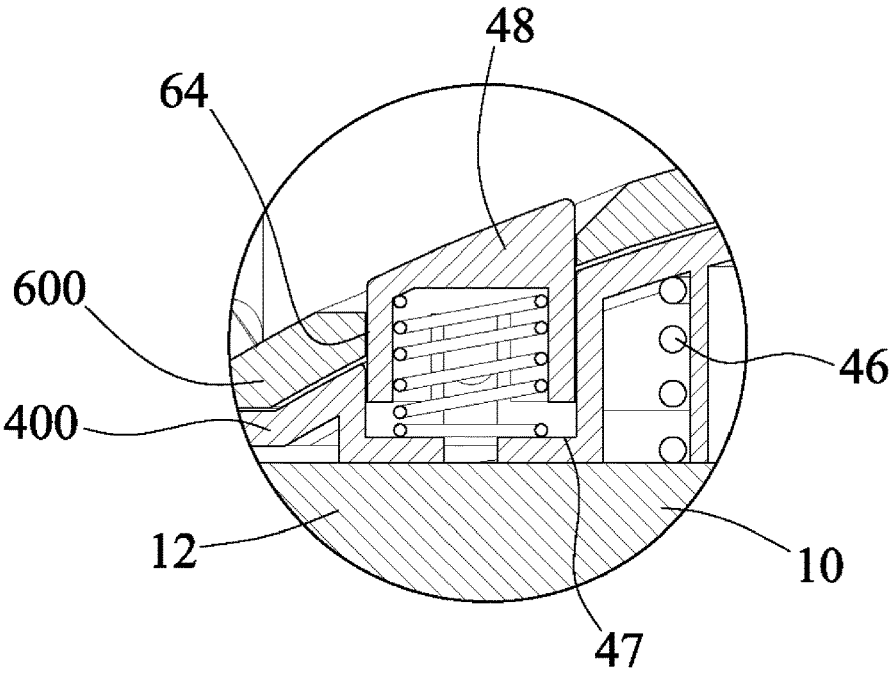
FIGS. 30, 31 are enlarged partial cross sectional views of the adjustable kettlebell as shown in FIGS. 27 and 28 respectively.
Figure 31:
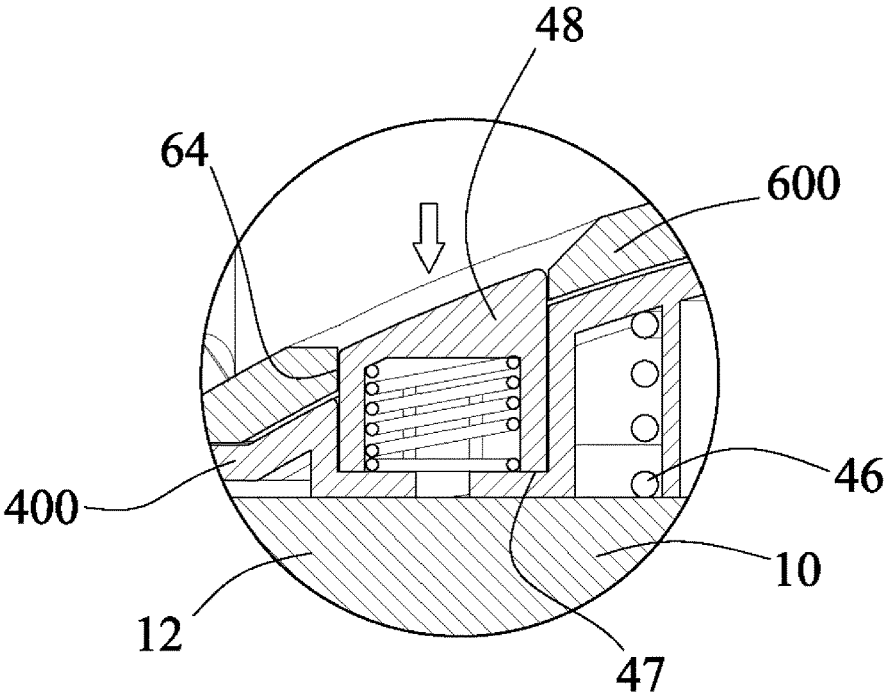

On the contrary, as shown in FIGS. 7 and 11, when the cam member 61 of the actuating knob 60 is pivoted downwardly toward the receptacle 10 and the cap 40, the shaft 50 and the pins 51 are moved upwardly relative to the receptacle 10 and the weight members 20-24, and the pins 51 of the shaft 50 may be engaged with the depressions 37 of the weight members 20-24 for anchoring the selected number of the weight members 20-24 to the receptacle 10 selectively. As shown in FIGS. 13A-13E, the opening 31-35 of the weight members 20-24 are aligned with each other for allowing the pins 51 of the shaft 50 to be engaged through the opening 31-35 of the weight members 20-24 and to be engaged into the spaces 36 of the weight members 20-24, and to be pivoted or rotated relative to the weight members 20-24 with the actuating knob 60 and the shaft 50 selectively, in order to engage with the depressions 37 of the weight members 20-24 selectively and respectively.

In operation, as shown in FIGS. 12-15, when the indicator 45 of the cap 40 is directed to or aligned with one of indicia 17, such as 16 (lb), for example, that is formed or provided on the receptacle 10, at this moment, the pins 51 of the shaft 50 are aligned with the opening 31-35 of the weight members 20-24 for allowing the pins 51 and the shaft 50 to be engaged through the opening 31-35 of the weight members 20-24 and to be removed or disengaged from the weight members 20-24, and for preventing the weight members 20-24 from being attached or mounted or secured or coupled to the receptacle 10 (FIG. 15), and at this moment, the receptacle 10 is weighed 16 lb, for example. As shown in FIGS. 16-19, when the indicator 45 of the cap 40 is directed to or aligned with the other indicium 17, such as 20 (lb), the shaft 50 is pivoted or rotated relative to the weight members 20-24 for an angle, and at this moment, the uppermost pin 51 of the shaft 50 is offset from the opening 31 of the uppermost weight member 20, but the other pins 51 of the shaft 50 are aligned with the opening 32-35 of the other weight members 21-24 for allowing only the uppermost weight member 20 to be attached to the receptacle 10, and for preventing the other weight members 21-24 from being attached to the receptacle 10 (FIG. 19), and at this moment, the receptacle 10 and the uppermost weight member 20 are weighed 20 lb.

Similarly, as shown in FIGS. 20-23, when the indicator 45 of the cap 40 is directed to or aligned with the other indicium 17, such as 24 (lb), the shaft 50 is further pivoted or rotated relative to the weight members 20-24 for another angle, and at this moment, the upper two pins 51 of the shaft 50 are offset from the openings 31, 32 of the upper two weight members 20, 21, but the other pins 51 of the shaft 50 are aligned with the opening 33-35 of the other weight members 22-24 for allowing only the upper two weight members 20, 21 to be attached to the receptacle 10, and for preventing the other weight members 22-24 from being attached to the receptacle 10 (FIG. 23), and at this moment, the receptacle 10 and the upper two weight members 20, 21 are weighed 24 lb, for example. As shown in FIGS. 24-31, the cap 400 may include a socket opening 47 formed therein (FIGS. 24, 30-31) for receiving or engaging with a spring biased projection or latch 48, and the actuating knob 600 may include an engaging aperture or element 64 formed or provided therein for selectively receiving or engaging with the spring biased latch 48 and for latching or locking the actuating knob 600 to the receptacle 10 and the cap 400 selectively and for preventing the actuating knob 600 from being actuated or operated inadvertently by the user.

Accordingly, the adjustable exercise device or kettlebell in accordance with the present invention includes an improved compact structure for allowing the weight members to be easily and quickly and adjustably attached to or disengaged from the weight carrier or handle and for allowing the adjustable kettlebell to be easily operated by the users.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An adjustable exercise device comprising:

a receptacle including a chamber formed therein, and including a handle device provided thereon, said receptacle including at least one guiding channel formed therein and communicating with said chamber of said receptacle, a first weight member and at least one second weight member selectively engageable into said chamber of said receptacle, said first weight member including at least one protrusion extended therefrom for slidably engaging with said at least one guiding channel of said receptacle and for preventing said first weight member from pivoting relative to said receptacle, said first weight member including an engaging member formed in said at least one protrusion, a cover including a projection extended therefrom for engaging with said engaging member of said at least one protrusion and for detachably securing said cover to said first weight member, and a control device including a shaft engaged through said receptacle and engaged into said chamber of said receptacle, and engageable through said first and said at least one second weight members for selectively anchoring either said first or said at least one second weight member to said receptacle with said shaft.

2. The adjustable exercise device as claimed in claim 1, wherein said first and said at least one second weight members each include a bore formed therein for engaging with said shaft of said control device, and said first and said at least one second weight members each include an opening formed therein and communicating with said bore of said first and said at least one second weight members, and said shaft includes a first pin engageable through said opening of said first weight member for selectively engaging with said first weight member, and at least one second pin engageable through said opening of said at least one second weight member for selectively engaging with said at least one second weight member.

3. The adjustable exercise device as claimed in claim 2, wherein said first and said at least one second weight members each include a space formed therein and communicating with said bore and said opening of said first and said at least one second weight members for selectively engaging with said first and said at least one second pin respectively.

4. The adjustable exercise device as claimed in claim 3, wherein said first and said at least one second weight members each include at least one depression formed therein and communicating with said bore and said space for selectively engaging with said first and said at least one second pin respectively.

5. The adjustable exercise device as claimed in claim 2, wherein said control device includes an actuating knob attached to said shaft for moving said shaft and said first and said at least one second pins relative to said receptacle.

6. The adjustable exercise device as claimed in claim 1, wherein said receptacle includes an upper wall for defining said chamber of said receptacle, and said receptacle includes a passage formed in said upper wall and communicating with said chamber of said receptacle.

7. The adjustable exercise device as claimed in claim 6, wherein said receptacle includes at least one engaging member formed in said upper wall, and said first weight member includes at least one key extended therefrom for selectively engaging with said at least one engaging member of said upper wall and for anchoring said first weight member to said receptacle.

8. The adjustable exercise device as claimed in claim 1, wherein said first weight member includes at least one recess formed therein, and said at least one second weight member includes at least one key extended therefrom for selectively engaging with said at least one recess of said first weight member and for anchoring said at least one second weight member to said first weight member.

9. An adjustable exercise device comprising:

a receptacle including a chamber formed therein, and including a handle device provided thereon, a first weight member and at least one second weight member selectively engageable into said chamber of said receptacle, and a control device including a shaft engaged through said receptacle and engaged into said chamber of said receptacle, and engageable through said first and said at least one second weight members for selectively anchoring either said first or said at least one second weight member to said receptacle with said shaft, said first and said at least one second weight members each including a bore formed therein for engaging with said shaft of said control device, and said first and said at least one second weight members each including an opening formed therein and communicating with said bore of said first and said at least one second weight members, and said shaft including a first pin engageable through said opening of said first weight member for selectively engaging with said first weight member, and at least one second pin engageable through said opening of said at least one second weight member for selectively engaging with said at least one second weight member, said control device including an actuating knob attached to said shaft for moving said shaft and said first and said at least one second pins relative to said receptacle, wherein said actuating knob includes a cam member pivotally coupled to said shaft with a pivot axle for moving said shaft and said first and said at least one second pins up and down relative to said receptacle and said first and said at least one second weight members selectively.

10. The adjustable exercise device as claimed in claim 9, wherein said receptacle includes a cap disposed thereon, and said cap includes an oblong hole formed therein for slidably engaging with said pivot axle.

11. The adjustable exercise device as claimed in claim 10, wherein said receptacle includes a plurality of indicia provided thereon, and said cap includes an indicator provided thereon for indicating either of said indicia of said receptacle.

12. The adjustable exercise device as claimed in claim 10, wherein said receptacle includes at least one peg extended upwardly therefrom, and said cap includes a peripheral slot formed therein for slidably engaging with said at least one peg and for guiding and limiting said cap to rotate relative to said receptacle.

13. The adjustable exercise device as claimed in claim 10, wherein said receptacle includes a spring biasing member engaged between said cap and said receptacle for selectively biasing and moving said cap upwardly from said receptacle.

*14. An adjustable weight device comprising:*

*a first portion and a second portion wherein the second portion comprises a receptacle forming a chamber, and at least one guiding channel formed therein and communicating with the chamber of the receptacle,*

*a handle,*

*a first weight member selectively engageable in the chamber of the second portion, the first weight member including a bore and at least one protrusion extended from an exterior surface of the first weight member for slidably engaging with the at least one guiding channel of the receptacle and for preventing the first weight member from pivoting relative to the receptacle, and an engaging member for selectively engaging the first portion, wherein the first portion includes a projection extended therefrom for engaging the engaging member of the first weight member, and*

*a control device including a shaft having one or more pins extending from a surface of the shaft positioned within the receptacle wherein the shaft passes through the bore in the first weight member for selectively anchoring the first weight member within the receptacle.*

*15. The adjustable weight device of claim 14 wherein the adjustable weight device further comprises at least one second weight member.*

*16. The adjustable weight device of claim 15 wherein the at least one second weight member is secured within the chamber of the receptacle.*

*17. The adjustable weight device of claim 16 wherein the at least one second weight member is selectively secured within the chamber of the receptacle by the control device.*

*18. An adjustable kettlebell comprising:*

*a body comprising a receptacle forming a chamber, the receptacle including at least one guiding channel formed therein and communicating with the chamber of the receptacle and an opening,*

*a shaft comprising a plurality of pins wherein the shaft is positioned within the chamber,*

*a handle,*

*a plurality of weight members positionable in the chamber of the receptacle, a first weight member of the plurality of weight members including a bore, at least one protrusion extended from an exterior surface of the first weight member for slidably engaging with the at least one guiding channel of the receptacle and for preventing the first weight member from pivoting relative to the receptacle, and an engaging member for selectively engaging a cover, wherein the cover engages the opening of the receptacle and includes a projection extended therefrom for engaging with the engaging member of the first weight member,*

*a plurality of indicia, and*

*a rotatable knob with an indicia selector,*

*wherein each position of the knob during rotation selectively engages a different subset of the plurality of weight members.*

*19. An adjustable kettlebell comprising:*

*a body comprising a handle, wherein the body comprises a receptacle having a chamber therein, the receptacle including at least one guiding channel formed therein and communicating with the chamber of the receptacle,*

*a shaft, rotatably coupled to the body, the shaft comprising a plurality of pins, the plurality of pins extending away from an exterior surface of the shaft; and*

*a plurality of weight members, each weight member in the plurality of weight members including an aperture operable to engage the shaft and further including at least one protrusion extended therefrom for slidably engaging with the at least one guiding channel of the receptacle for preventing the plurality of weight members from pivoting relative to the receptacle, and an engaging member for selectively engaging a cover, wherein the cover includes a projection extended therefrom for engaging with the engaging member of a first weight member of the plurality of weight members, and*

*a selector operable to select a target weight,*

*wherein the plurality of pins selectively engage with one or more weight members of the plurality of weight*

*members, such that rotation of the shaft selectively couples a subset of the plurality of pins to one or more weight members in response to the target weight selected by the selector.*

*20. The adjustable kettlebell of claim 19, wherein a weight member of the plurality of weight members further comprises a notch operable to engage at least one pin of the plurality pins to secure the weight member to the shaft.*

*21. An adjustable weight comprising:*

*a body comprising a receptacle with an open weight receiving end, the receptacle including at least one guiding channel formed therein and communicating with a chamber of the receptacle;*

*the at least one guiding channel on an interior surface of the chamber;*

*a shaft positioned within the chamber;*

*one or more weight members, wherein the one or more weight members have an aperture for engaging the shaft and at least one protrusion extended therefrom for slidably engaging with the at least one guiding channel of the receptacle for preventing a first weight member from pivoting relative to the receptacle, a first weight member of the one or more weight members including an engaging member for selectively engaging a cover, wherein the cover includes a projection extended therefrom for engaging with the engaging member of the first weight member; and*

*a control device configured to selectively engage the one or more weight members to detachably secure the one or more weight member within the body in response to a weight selection.*

*22. The adjustable weight of claim 21 further comprising a handle extending from an exterior surface of the body.*

*23. The adjustable weight of claim 21 further comprising indicia on an exterior surface of the body configured to indicate a selection of selectively engaged one or more weight members.*

*24. The adjustable weight of claim 21, wherein the shaft further comprises a plurality of pins configured to engage one or more of the one or more weight members via a notch in the aperture of each weight member of the one or more weight members.*

*25. The adjustable weight of claim 24, wherein the aperture of each weight member further comprises one or more depressions.*

*26. The adjustable weight of claim 21, further comprising a cap including a socket aperture for engaging a spring-biased latch and an actuating knob to selectively engage the one or more weight members.*

* * * * *